United States Patent
Christiansen et al.

(10) Patent No.: US 11,537,561 B2
(45) Date of Patent: Dec. 27, 2022

(54) TECHNIQUES FOR HANDLING LETTER CASE IN FILE SYSTEMS

(71) Applicant: MICROSOFT TECHNOLOGY LICENSING, LLC, Redmond, WA (US)

(72) Inventors: Neal Robert Christiansen, Bellevue, WA (US); Chandra Kumar Konamki Vijayamuneeswaralu, Monroe, WA (US); Craig Ashley Barkhouse, Duvall, WA (US); Sven Groot, Renton, WA (US); John Andrew Starks, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 620 days.

(21) Appl. No.: 15/844,425

(22) Filed: Dec. 15, 2017

(65) Prior Publication Data
US 2019/0188279 A1    Jun. 20, 2019

(51) Int. Cl.
*G06F 7/02*    (2006.01)
*G06F 16/00*    (2019.01)
(Continued)

(52) U.S. Cl.
CPC ............ *G06F 16/148* (2019.01); *G06F 16/13* (2019.01); *G06F 16/14* (2019.01); *G06F 16/156* (2019.01);
(Continued)

(58) Field of Classification Search
CPC ...... G06F 16/156; G06F 16/16; G06F 16/148; G06F 16/172; G06F 16/14; G06F 16/152; G06F 16/13; G06F 16/137; G06F 17/21
See application file for complete search history.

(56) References Cited

U.S. PATENT DOCUMENTS 10,515,052 B2 * 12/2019 Wang ................... G06F 16/152
2006/0200465 A1    9/2006 Chuang
(Continued)

FOREIGN PATENT DOCUMENTS

WO        9942934 A2    8/1999

OTHER PUBLICATIONS

Lowe, Nick, "Understanding Case Sensitivity in Windows: obcaseinsensitive file case sensitive search—Nick's Tech Blog", Retrieved from: https://web.archive.org/web/20130109091331/http://www.nicklowe.org/, Jan. 9, 2013, 5 Pages.
(Continued)

*Primary Examiner* — Bruce M Moser
(74) *Attorney, Agent, or Firm* — Jacob P. Rohwer; Newport IP, LLC

(57) ABSTRACT

Described herein are technologies that provide an element of security related to file system operations. Individual nodes in a file system, such as a directory or a file, can be associated with information that describes how to handle letter case when a file name included in a file system operation request is used to locate a file in the file system. For example, a case sensitive designation associated with a directory can require a case sensitive match between a file name included in a request and a file name included in the directory, in order to perform the requested file system operation. In another example, a case preferring designation associated with a directory first checks for a case sensitive match between file names. If a case sensitive match does not exist, then a case insensitive match between the file names can be used to perform the requested file system operation.

15 Claims, 13 Drawing Sheets

(51) Int. Cl.
  *G06F 16/14* (2019.01)
  *G06F 16/172* (2019.01)
  *G06F 16/13* (2019.01)
  *G06F 40/10* (2020.01)
  *G06F 16/16* (2019.01)

(52) U.S. Cl.
  CPC ............ G06F 16/16 (2019.01); G06F 16/172 (2019.01); G06F 40/10 (2020.01)

(56) References Cited

U.S. PATENT DOCUMENTS

2007/0294388 A1* 12/2007 Yu ..................... H04L 61/4523
                                                            709/224
2008/0228843 A1   9/2008 Dodge et al.
2009/0164440 A1*  6/2009 Pudipeddi ........... G06F 11/1417
2015/0324386 A1* 11/2015 Calder .................. H04L 69/08
                                                            707/649

OTHER PUBLICATIONS

"International Search Report and Written Opinion Issued in PCT Application No. PCT/US2018/062389", dated Apr. 11, 2019, 20 Pages.

"Office Action Issued in Indian Patent Application No. 202047020960", dated Mar. 30, 2022, 8 Pages.

"Office Action Issued in European Patent Application No. 18819412.0", dated Feb. 25, 2022, 10 Pages.

* cited by examiner

TECHNIQUES FOR HANDLING LETTER CASE IN FILE SYSTEMS

BACKGROUND

A host system such as a computer or a server is configured to interact with a file system to perform operations in association with stored files (e.g., open a file, delete a file, write to a file, read from a file, replace a file, copy a file, move a file, search for a file, create a file, etc.). There are a variety of different file systems, some of which can be designed to be used for specific applications or specific operating systems executing on a host system. A file system is typically configured as a hierarchical structure that includes nodes representing directories and/or files. Moreover, a file system comprises logic that enables navigation through the nodes to locate a file (e.g., a document, an executable, a spreadsheet, an image, a video, etc.) and to perform an operation in association with the file.

When requesting a file system operation, an operating system, an application, or some other module executing on a host system can provide or pass a path name to the file system. The path name typically includes a file name that identifies the file stored in the file system. The path name can also include one or more other components useable by the file system to navigate the hierarchical structure of the file system in order to locate the file. An individual component in a path name can identify, for example, a host device or a network device that contains the file (e.g., a server), a hardware device (e.g., a drive), a directory, a file name for the file (e.g., a base file name), and a file type (e.g., a file format or file extension). At least some of the components of a path name can reflect the file system hierarchy and can be separated by a delimiting character (e.g., a slash "/", a backslash character "\", a colon ":", etc.).

Conventional file systems often permit multiple different files to have file names that vary in letter case only. For example, a first file named "run.exe" and a second file named "RUN.exe" can be located in a same directory of a file system. This makes the file system vulnerable to security threats. For instance, a given path name associated with a request to open a file may identify "run.exe" but the directory in the file system that contains the file "run.exe" may also contain the file "RUN.exe". The file "RUN.exe" may have been maliciously added to the directory via a cyber-attack. Due to an American Standard Code for Information Interchange (ASCII) collation order commonly used by the file system to identify a file from multiple different files with the same name that varies in letter case only, the file system will mistakenly open the "RUN.exe" file rather than the "run.exe" file because the ASCII collation order prioritizes an upper-case letter such as "R" before its corresponding lower-case letter such as "r". Performing such a file system operation on the incorrect file can have major security ramifications.

Even further, due to the ASCII collation ordering of files with the same name, an application or operating system may never be able to open a particular file that it wants to open (e.g., "run.exe" is always ordered behind "RUN.exe"). In this situation, the file "RUN.exe" may not even be a malicious file.

It is with respect to these and other considerations that the disclosure made herein is presented.

SUMMARY

Technologies described herein provide an element of security related to file system operations by considering letter case of a file name. In various examples, individual nodes in a file system, such as a directory or a file, can be associated with information that describes how to handle letter case when a file name included in a file system operation request is used to locate a file in the file system. A name assigned to a file stored in a file system may be referred to as an "actual" file name. A name of a file provided to a file system as part of a request to perform a file system operation may be referred to as a "given" file name. Accordingly, the file system is configured to navigate the hierarchical structure of the file system to find an actual file name that matches the given file name, so that the requested file system operation can be performed on a file with the actual file name.

As used herein, a "case insensitive" match is one where the actual file name and the given file name from a request vary in case only. Stated another way, corresponding characters and/or symbols of the two file names match (e.g., on a position by position basis), but at least one character in one file name may be upper-case while a corresponding character in the same position of the other file name is lower-case. As an example, "run.exe", "RUN.exe", and "Run.exe" are file names that are case insensitive matches of one another. A "case sensitive" match is one where the actual file name and the given file name from a request match exactly, including case matches. In other words, the two file names cannot vary in case. As an example, "run.exe" and "run.exe" is a case sensitive match.

In a first implementation described herein, the information that describes how to handle letter case can comprise a "case sensitive" designation or a "case insensitive" designation for individual directories in a file system. The case sensitive designation or the case insensitive designation can be specified in an attribute that is assigned to individual directories of the file system on a directory-by-directory basis. In various examples, a creator of the directory (e.g., a user) or anyone else with permission to modify an attribute of a directory can be allowed to specify a designation and assign the attribute to the directory. In alternative examples, the attribute can be assigned as part of a default configuration for the file system, which can subsequently be changed based on user input (e.g., a default case insensitive directory can be switched to a case sensitive directory). To successfully perform a file system operation on a file in a directory that has a case sensitive designation, the file system must determine that a case sensitive match exists between a given file name from a request for the file system operation (e.g., a request to open a file) and an actual file name associated with a file contained in the directory. To the contrary, in order to successfully perform a file system operation on a file in a directory that has a case insensitive designation, the file system is allowed to determine that a case insensitive match exists between the given file name from the request for the file system operation and an actual file name associated with a file contained in the directory. A case insensitive designation also allows the file system to successfully perform the file system operation based on a case sensitive match.

In a second implementation described herein, the information that describes how to handle letter case can comprise a "case preferring" designation for individual directories in a file system. In various examples, a creator of a directory (e.g., a user) or anyone else who has permission to modify attributes of the directory can be allowed to specify the designation for that directory. In alternative examples, the designation can be a default designation for directories based on an initial configuration of a file system. To perform a file system operation on a file in a directory that has a case preferring designation, the file system first determines if a case sensitive match between a given file name from a request for the file system operation and an actual file name associated with a file contained in the directory exists. If a case sensitive match exists, the file system performs the file system operation in association with the file matched in a case sensitive manner. If a case sensitive match does not exist, the file system subsequently determines if a case insensitive match between the given file name from the request for the file system operation and an actual file name associated with a file contained in the directory exists. If the case insensitive match exists, the file system performs the file system operation in association with the file matched in a case insensitive manner. In some examples, an actual file name that matches a given file name in a case insensitive manner may be tagged by the file system as a preferred case insensitive match so that the file system operation is performed on a particular file rather than on files associated with other case insensitive matches.

In a third implementation described herein, the information that describes how to handle letter case can comprise a designation whether case varying (e.g., case insensitive) duplicate file names are prohibited, or alternatively, are allowed. A case varying duplicate is file name that varies in case only from another file name. The designation can be assigned to an individual directory or to an individual file. In various examples, a creator of a directory (e.g., a user) or anyone else who has permission to modify attributes of the directory can be allowed to specify the designation for that directory. In alternative examples, the designation can be a default designation for directories as part of an initial configuration of a file system. For example, a directory can be assigned a designation indicating that "child" case varying duplicates are prohibited. A "child" refers to a node (e.g., a file or a directory) contained in the directory at a level in a hierarchical structure directly or immediately below the directory to which the designation is assigned. In another example, a directory or a file can be assigned a designation indicating that "sibling" case varying duplicates are prohibited. A "sibling" refers to a node within a same directory and at a same level in the hierarchical structure. The file system operation prevents the creation and/or storage of files based on a designation that prohibits case varying duplicate file names.

By enabling a file system to handle letter case differently for individual directories and/or files contained therein, creators (e.g., developers, managers, etc.) and users of the file system are provided with an element of security without disrupting normal use of the file system. For example, a first directory in a file system that contains files that perform critical functionality for a host system (e.g., booting an operating system) can have a stricter designation that enables the element of security (e.g., a case sensitive designation, a case preferring designation with a case insensitive match, a designation that case varying duplicate file names are prohibited, etc.), while a second directory that contains user files can have a looser designation (e.g., a case insensitive designation, etc.). Furthermore, by enabling a file system to assign different designations to individual directories and/or files contained therein, an application or an operating system of a host system are able to interact with various sub-systems of the file system in a more seamless manner. That is, a file system is not restricted by some wholistic or global rule that uniformly handles letter case, but rather, the file system can use individual designations to implement a variety of solutions on a directory-by-directory basis and/or on a file-by-file basis.

In various examples, a security descriptor can be associated with a directory or a file in a file system. The security descriptor can include an access control list (ACL) that defines user accounts and/or group accounts to which a designation is applicable. For example, an ACL may define that USER A can access files in a particular directory in a case insensitive manner, while USER B must access the same files in the same directory in a case sensitive manner. Accordingly, an ACL can be established to control file system operation performance differently for specific users and/or groups.

In further examples, the way in which a hash is used by a cache to access a file can be altered in accordance with a case sensitive designation or a case insensitive designation. A cache of a file system is a subset of memory that retains recently used information for quicker access to commonly used files, for example. Typically, the cache stores a hash of a full path name (e.g., a hash of "directory1/directory2/directory3/file") useable to access a file (e.g., an actual path name known to provide access to the file). As further described herein, a cache associated with a file system can be structured in a hierarchical manner (e.g., a tree structure) such that an individual cache node in the path name can have its own hash, and the hash can be associated with a case sensitive label or a case insensitive label.

Using the example path name provided in the preceding paragraph, if "directory1" is assigned an attribute with an insensitive case designation in the file system, then the hash of the "directory2" cache node in the cache is labeled as a case insensitive hash and can be matched in a case insensitive manner (e.g., "directory2" is anode contained within "directory1" in the file system). If "directory2" is assigned an attribute with a case sensitive designation in the file system, then the hash of the "directory3" cache node in the cache is a case sensitive hash and must be matched in a case sensitive manner (e.g., "directory3" is a node contained within "directory2" in the file system). If "directory3" is assigned an attribute with a case sensitive designation in the file system, then the hash of the "file" cache node in the cache is a case sensitive hash and must be matched in a case sensitive manner (e.g., "file" is a node contained within "directory3" in the file system). Accordingly, when a hash is used to attempt to access (e.g., look-up) data in the cache, the cache is configured to compare the hash to the individual hashes of the cache nodes in order to find a cache hit. Stated another way, a hash look-up (e.g., used to access a file in the cache) is implemented by matching the hash of each cache node in the tree structure in a case sensitive or in a case insensitive manner, rather than matching the hash of the full path name. In some instances, the cache can be a negative cache that includes an entry that indicates a failure or a file that is not present.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

In FIG. 4, an actual file name that matches a given file name in a case insensitive manner may be tagged by the file system as a preferred case insensitive match, so the actual file is selected over other files with case insensitive matches.

DETAILED DESCRIPTION

The following Detailed Description describes technologies that enable a system to provide an element of security related to file system operations by considering letter case of a file name (e.g., letter case may be referred to herein as "case"). In various examples, individual nodes in a file system, such as a directory or a file, can be associated with information that describes how to handle letter case when a file name included in a file system operation request is used to locate a file in the file system. For example, a directory may be assigned a case sensitive designation which requires an exact match (e.g., with no variation in case) between a given file name from a request and an actual file name of a file contained in the directory. In another example, a directory may be assigned a case insensitive designation where a match between a given file name and an actual file name does not have to be exact but can vary in case. In yet another example, a directory may be assigned a case preferring designation where a file system first attempts to locate an exact match, and if an exact match cannot be found, then the file system attempts to locate a match that varies in case. Even further, a directory may be assigned a designation that prohibits case varying duplicate names.

The disclosed technologies represent a substantial advantage over existing file systems which are not configured to handle letter case in an effective manner.

Figure 1:
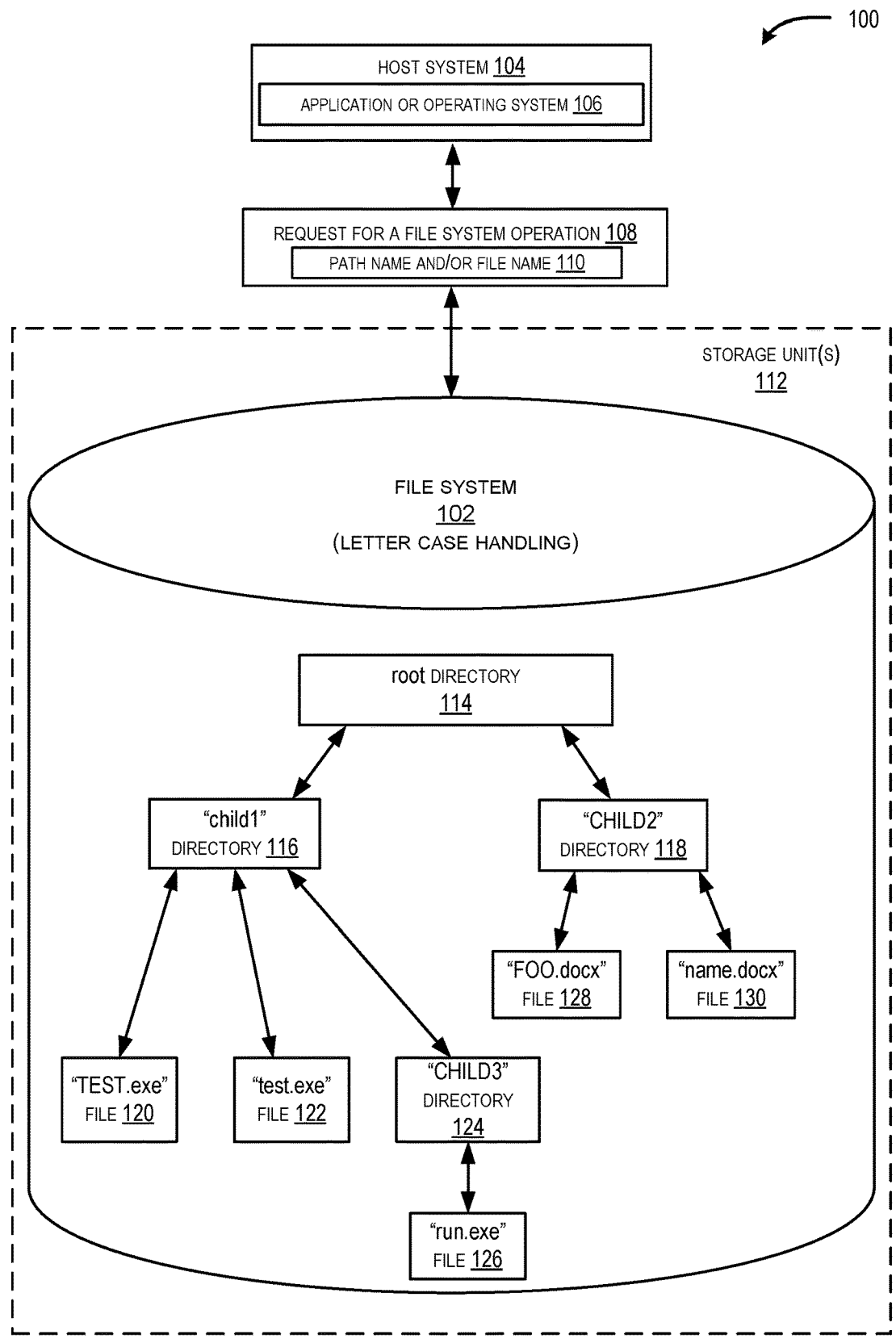
FIG. 1 is an example diagram depicting a file system that is configured to handle letter case when navigating a hierarchical structure and/or locating a file.

FIG. 1 is an example diagram 100 depicting a file system 102 that is configured to handle letter case when navigating a hierarchical structure and/or locating a file. As used herein, the term "hierarchical structure" may generally refer to any scheme that may organize the storage of files and/or that may cause the files to be displayed to a user. In various examples, the file system 102 can support an operating system of a device. In further examples, the file system 102 can be part of a file hosting platform including, but not limited to, DROPBOX, BOX, GOOGLE DRIVE, MEGA, PCLOUD, SUGARSYNC, AMAZON DRIVE, and/or MICROSOFT ONEDRIVE. To this end, the file system 102 is configured to interact with a host system 104 (e.g., a computing device, a server, etc.). The host system 104 can include an application or an operating system 106, or some other module, that initiates a request for a file system operation 108 while being executed on the host system 104. A request for a file system operation may be referred to herein as a "request". Example file system operations include, but are not limited to: opening a file, deleting a file, writing to a file, reading from a file, replacing a file, copying a file, moving a file, searching for a file (e.g., as part of a pattern matching query), creating a file, etc.

In various examples, a file system can comprise one or more layers. For instance, a first "logical" layer of a file system is configured to control interactions with an operating system or an application of a host system. The logical layer can provide an application program interface (API) for receiving requests for file system operations and for passing the request to a "virtual" layer and/or a "physical" layer of the file system for processing. A virtual layer is an interface that supports multiple concurrent instances of a physical file system. The physical layer handles the physical operation of a storage unit (e.g., a disk). For instance, the physical layer processes physical blocks being read or written, the physical layer handles buffering and memory management, and/or the physical layer is responsible for the placement of blocks in specific locations on the storage unit. The layers described above may be separate, or their functions can be combined such that a file system is not comprised of separate layers.

The request 108 includes a path name and/or a file name 110 that identifies a file stored in the file system 102 on which to perform the requested file system operation. A path name can include components useable by the file system 102 to navigate the hierarchical structure of the file system 102 in order to search for and locate the file. As described above, an individual component in a path name can identify, for example, a host device or a network device that contains the file (e.g., a server), a hardware device such as a storage unit (e.g., a drive), a directory, a file name for the file (e.g., a base file name), and a file type (e.g., a file format or file extension). At least some of the components of a path name can reflect the hierarchical structure of the files system 102 and can be separated by a delimiting character (e.g., a slash "/", a backslash character "\", a colon ":", etc.). In some instances, reference to a "file name", as used herein, can include both a file name component and a file type component (e.g., a file name can be "run.exe").

The file system 102 can be persistently stored on storage unit(s) 112. A storage unit 112 can be a hard disk drive or a solid-state drive. Examples of a storage unit 112 include: a machine (e.g., a server), a disk, a platter, a sector, and so forth. In some instances, storage units can be arranged into a "rack" (e.g., a row) and multiple racks of storage units can be arranged into a "grid" of storage units (e.g., configured within a data center). A storage unit 112 can be local to the host system 104 (e.g., local storage) or a storage unit 112 can be remotely located such that the file system 102 is accessed by the host system 104 over a network. In various examples, one or more storage units 112 can comprise a volume or a logical drive.

To illustrate further examples related to handling letter case, the file system 102 includes a root directory 114 (e.g., represented by a "\" or some other representation in a path name), which typically is the first or top-most directory in a file system. The root directory 114 comprises intermediate directories—a "child1" directory 116 and a "CHILD2" directory 118. The "child1" directory 116 contains a first file (e.g., "TEST.exe" file 120), a second file (e.g., "test.exe" file 122), and another intermediate directory (e.g., "CHILD3" directory 124) which includes a file (e.g., "run.exe" file 126). The "CHILD2" directory 118 contains a first file (e.g., "FOO.docx" file 128) and a second file (e.g., "name.docx" file 130).

As shown, an individual directory in the file system 102 can include one or more files and/or one or more directories. The hierarchical structure of the directories and/or files illustrated in FIG. 1 is provided for ease of discussion with respect to the various examples described herein. Accordingly, the hierarchical structure of the directories and/or files illustrated in FIG. 1 is used herein as a basis to show how the file system 102 can be configured with information that describes how to handle letter case when a file name included the request 108 is used to locate a file in the file system 102. Accordingly, it is understood in the context of this disclosure that, any number of directories and/or files can be arranged in various hierarchical structures in order to organize and/or access data (e.g., files) stored across storage unit(s) 112.

As used herein, a "level" in a hierarchical structure refers to nodes that are located in a same directory. Thus, the "child1" directory 116 and the "CHILD2" directory 118 are sibling nodes that are part of a same level, since they are located directly or immediately below the root directory 114. Moreover, the "TEST.exe" file 120, the "test.exe" file 122, and the "CHILD3" directory 124 are sibling nodes that are part of a same level, since they are located directly below the "child1" directory 116.

Figure 2:
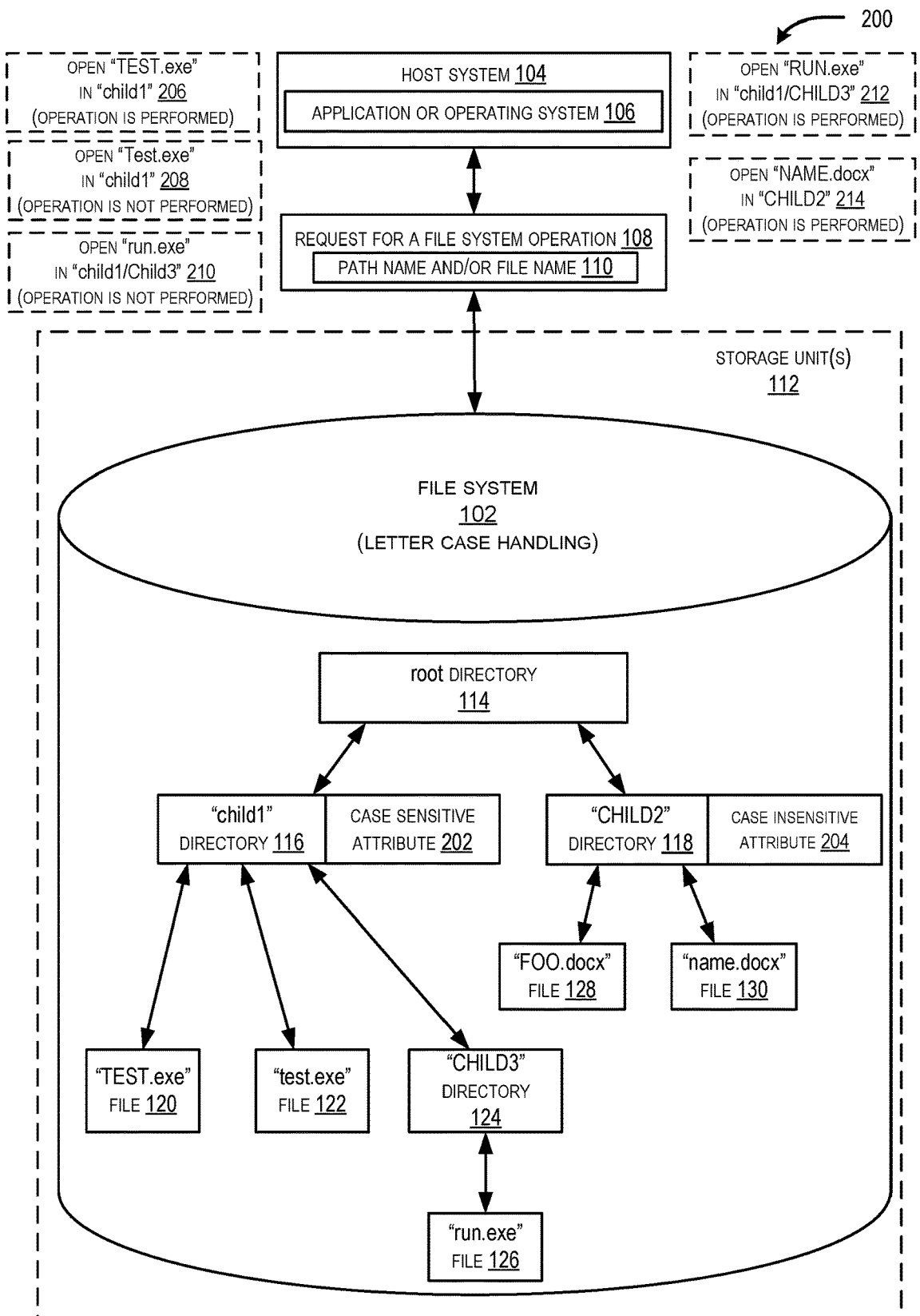
FIG. 2 is an example diagram depicting a file system that is configured to use a case sensitive designation or a case insensitive designation in order to perform a file system operation.

FIG. 2 is an example diagram 200 depicting a file system 102 that is configured to use a "case sensitive" designation or a "case insensitive" designation in order to perform a file system operation. A case sensitive designation or a case insensitive designation can be assigned to individual directories in a file system. The case sensitive designation or the case insensitive designation can be specified in an attribute that is assigned to a directory based on user input or based on a default configuration for the file system 102. For instance, in FIG. 2, the "child1" directory 116 is assigned a case sensitive attribute 202 while the "CHILD2" directory 118 is assigned a case insensitive attribute 204. In various examples, a creator or developer (e.g., a user) or anyone else with permission to modify or control the directory can specify the designation and assign the attribute to the directory.

To perform a file system operation on a file in a directory that has a case sensitive designation, the file system 102 must determine that a case sensitive match exists between a file name given in the request for the file system operation and an actual file name associated with a file contained in the directory. For instance, the file system operation can comprise: opening a file, deleting a file, writing to a file, reading from a file, replacing a file, copying a file, moving a file, searching for a file, and so forth. In a situation where the file system operation is a create a file, and in accordance with the case sensitive designation, the file system 102 must determine that a case sensitive match does not exist between a file name given in the request for a new file and an actual file name associated with a file contained in the directory, in order for the file system 102 to perform the file system operation (e.g., create a new file in the directory).

FIG. 2 illustrates a request 206 to open the file "TEST.exe" in the "child1" directory (e.g., "TEST.exe" and "child1" may be components of a path name passed to the file system 102 by an application or an operating system). Given the request 206, the file system 102 checks the "child1" directory 116 and determines, via the case sensitive attribute 202, that a case sensitive match is required between the given file name in the request 206 and an actual file name of a file in the "child1" directory 116 in order to successfully perform the file system operation. In this instance, the request 206 is completed and the file system operation is performed because the file system 102 determines that a case sensitive match for the file name given in the request 206 (e.g., "TEST.exe") exists in the "child1" directory 116. That is, the "child1" directory 116 includes a file 120 with an actual file name of "TEST.exe".

FIG. 2 further illustrates another request 208 to open the file "Test.exe" in the "child1" directory. Given the request 208, the file system 102 checks the "child1" directory 116 and determines, via the case sensitive attribute 202, that a case sensitive match is required between the given file name in the request 208 and an actual file name of a file in the "child1" directory 116 in order to successfully perform the file system operation. In contrast to the successful performance of the file system operation with regard to the request 206, request 208 is not completed and the file system operation is not performed because the file system 102 determines that a case sensitive match for the file name given in the request 206 (e.g., "Test.exe") does not exist in the "child1" directory 116. That is, the "child1" directory 116 does not include a file with an actual file name of "Test.exe" (considering letter case).

FIG. 2 further illustrates yet another request 210 to open the file "run.exe" in the "child1/Child3" directories. Again, "run.exe" and "child1/Child3" may be components of a path name that is passed to the file system 102 by an application or an operating system. In this example, due to the case sensitive attribute 202, a case sensitive match must exist between a directory name given in the path name and an actual directory name contained in the "child1" directory. Given the request 210, the file system 102 checks the "child1" directory 116 and determines, via the case sensitive attribute 202, that a case sensitive match is required between the given directory name (e.g., "Child3") in the request 210 and an actual name of a directory in the "child1" directory 116 in order to successfully perform the file system operation. Consequently, request 210 is not completed and the file system operation is not performed because the file system 102 determines that a case sensitive match for the directory name given in the request 210 (e.g., "Child3") does not exist in the "child1" directory 116. That is, the "child1" directory 116 does not include a directory with an actual directory name of "Child3", but rather, the "child1" directory 116 includes a directory with an actual directory name of "CHILD3".

In yet a further example, FIG. 2 illustrates another request 212 to open the file "RUN.exe" in the "child1/CHILD3" directories. In this example, due to the case sensitive attribute 202, a case sensitive match must exist between a directory name given in the path name and an actual directory name contained in the "child1" directory. Given the request 212, the file system 102 checks the "child1" directory 116 and determines, via the case sensitive attribute 202, that a case sensitive match is required between the given directory name (e.g., "CHILD3") in the request 212 and an actual name of a directory in the "child1" directory 116 in order to successfully perform the file system operation. Consequently, request 212 is completed and the file system operation is performed because the file system 102 determines that a case sensitive match for the directory name given in the request 212 (e.g., "CHILD3") exists in the "child1" directory 116. Note that in this example, the file system operation is performed in association with the "run.exe" file 126 even though the given file name is "RUN.exe" (e.g., the "CHILD3" directory 124 is assigned a case insensitive attribute).

As illustrated, when a directory has a case sensitive designation, a name of an individual component given in a path name must match, in a case sensitive manner, a corresponding name of a node (e.g., a file or a directory) that is contained within the directory in order to perform a file system operation on a file in the file system.

To perform a file system operation via a directory that has a case insensitive designation, the file system 102 is allowed to determine that a case insensitive match exists between a file name given in a request for a file system operation and an actual file name associated with a file contained in the directory. While case insensitive matches are allowed, this designation also allows case sensitive matches between a file name given in a request and an actual file name to successfully perform a requested file system operation.

FIG. 2 illustrates a request 214 to open the file "NAME.docx" in the "CHILD2" directory. Given the request 214, the file system 102 checks the "CHILD2" directory 118 and determines, via the case insensitive attribute 204, that a case insensitive match is allowed between the given file name in the request 214 and an actual file name of a file in the "CHILD2" directory 118 in order to successfully perform the file system operation. In this instance, the request 214 is completed and the file system operation is performed because the file system 102 determines that a case insensitive match for the file name given in the request 214 (e.g., "NAME.docx") exists in the "CHILD2" directory 118. That is, the "CHILD2" directory 118 includes a file 130 with an actual file name of "name.docx", which is a case insensitive match of "NAME.docx".

Figure 3:
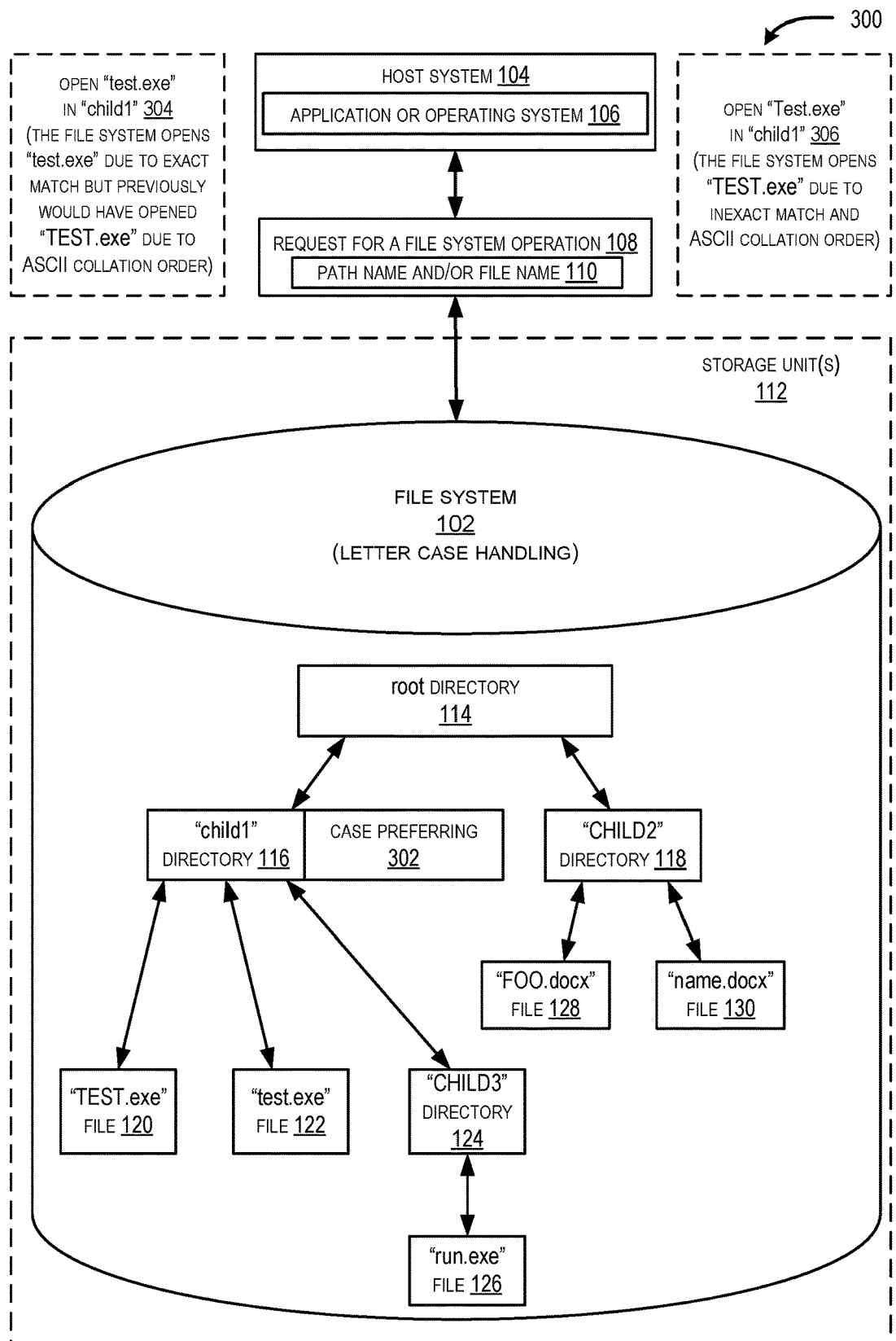
FIG. 3 is an example diagram depicting a file system that is configured to use a case preferring designation in order to perform a file system operation.

FIG. 3 is an example diagram 300 depicting a file system 102 that is configured to use a "case preferring" designation in order to perform a file system operation. In various examples, a creator or developer of the directory (e.g., a user) can specify the case preferring designation, or the designation can be a default designation for individual directories in a file system based on an initial configuration of the file system.

In FIG. 3, the "child1" directory 116 is assigned a case preferring designation 302. To perform a file system operation via a directory that has a case preferring designation, the file system 102 first determines if a case sensitive match between a file name given in a request for a file system operation and an actual file name associated with a file contained in the directory exists. If a case sensitive match exists, the file system performs the file system operation in association with the file matched in a case sensitive manner. If a case sensitive match does not exist, the file system subsequently determines if a case insensitive match between the file name given in the request for the file system operation and an actual file name associated with a file contained in the directory exists. If the case insensitive match exists, the file system performs the file system operation in association with the file matched in a case insensitive manner. The file system operation can comprise: opening a file, deleting a file, writing to a file, reading from a file, replacing a file, copying a file, moving a file, searching for a file, and so forth.

FIG. 3 illustrates a request 304 to open the file "test.exe" in the "child1" directory (e.g., "test.exe" and "child1" may be components of a path name passed to the file system 102 by an application or an operating system). Given the request 304, the file system 102 checks the "child1" directory 116 and determines, via the case preferring designation 302, that if a case sensitive match does not exist between the given file name in the request 304 and an actual file name of a file in the "child1" directory 116, then it can be determined whether a case insensitive match occurs. In this instance, the request 304 is completed and the file system operation is performed because the file system 102 determines that a case sensitive match for the file name given in the request 304 (e.g., "test.exe") exists in the "child1" directory 116. That is, the "child1" directory 116 includes a file 122 with an actual file name of "test.exe". A conventional file system in this scenario would have opened "TEST.exe" due to the ASCII collation order.

FIG. 3 illustrates another request 306 to open the file "Test.exe" in the "child1" directory. Given the request 306, the file system 102 checks the "child1" directory 116 and determines, via the case preferring designation 302, that if a case sensitive match does not exist between the given file name in the request 304 and an actual file name of a file in the "child1" directory 116, then it can be determined whether a case insensitive match occurs. In this instance, the request 306 is completed and the file system operation is performed because the file system 102 first determines that a case sensitive match for the file name given in the request 306 (e.g., "Test.exe") does not exist in the "child1" directory 116. The file system 102 then determines that a case insensitive match for the file name given in the request 306 (e.g., "Test.exe") exists in the "child1" directory 116. That is, the "child1" directory 116 includes a file 120 with an actual file name of "TEST.exe" and a file 122 with an actual file name of "test.exe". In various examples, the file system 102 selects the "TEST.exe" file due to the ASCII collation order.

While the example of FIG. 3 illustrates a case preferring scenario with respect to files, it is understood in the context of this disclosure, that the techniques described herein can perform a case preferring implementation with respect to directories as well. That is, a file system can identify case sensitive and/or case insensitive matches amongst sibling directories that have the same name that varies in case only, and that are part of a same level.

Figure 4:
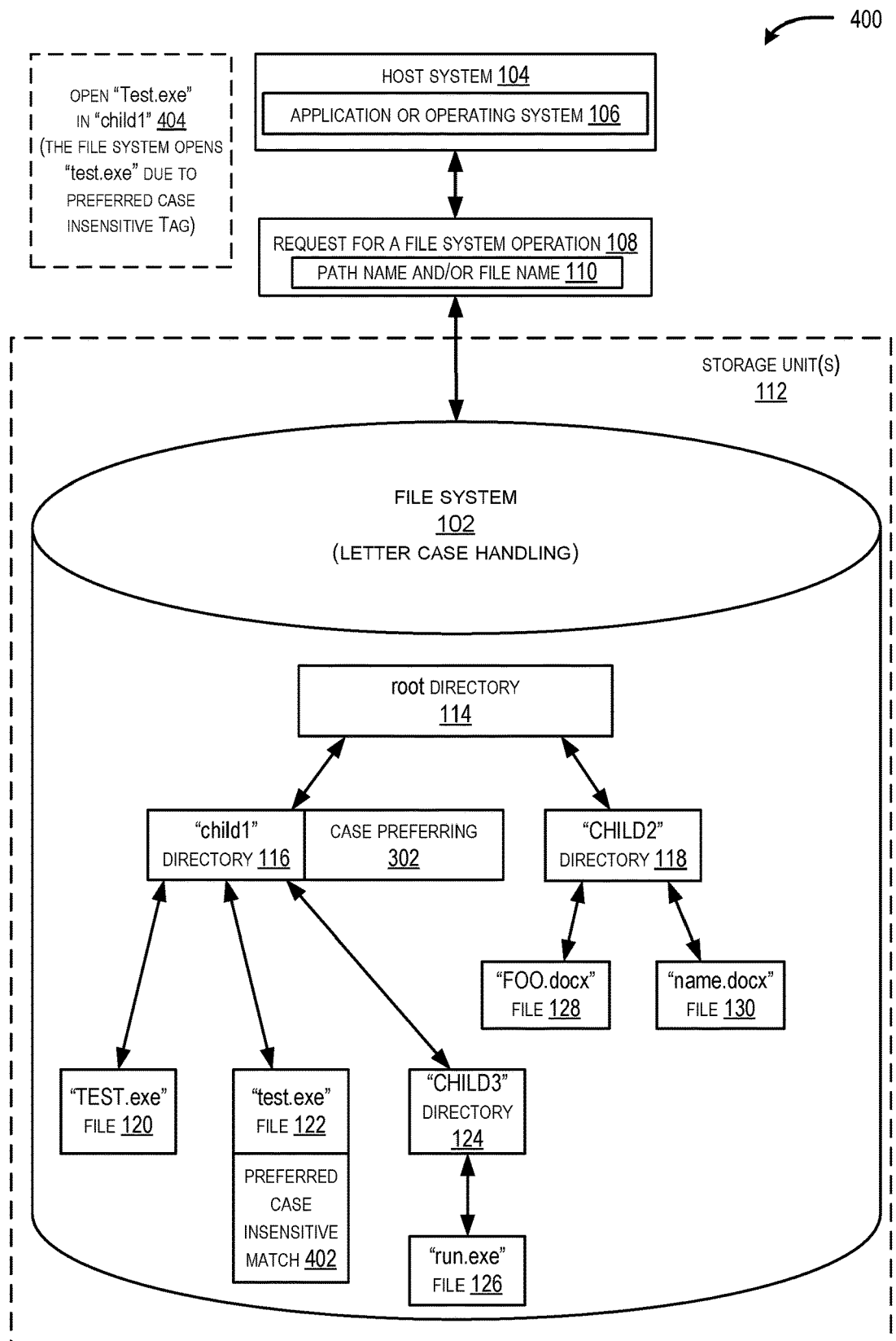
FIG. 4 is another example diagram depicting a file system that is configured to use a case preferring designation in order to perform a file system operation.

FIG. 4 is another example diagram 400 depicting a file system 102 that is configured to use a "case preferring" designation in order to perform a file system operation. However, in FIG. 4, an actual file name that matches a given file name in a case insensitive manner may be tagged by the file system 102 as a preferred case insensitive match so the actual file is selected over other case insensitive matches.

For example, FIG. 4 illustrates that a preferred case insensitive match tag 402 is assigned to the "test.exe" file 122 in the "child1" directory 116. Given a request 404 to open the file "Test.exe" in the "child1" directory (e.g., same as the request 306 in FIG. 3), the file system 102 checks the "child1" directory 116 and determines, via the case preferring designation 302, that if a case sensitive match does not exist between the given file name in the request 402 and an actual file name of a file in the "child1" directory 116, then it can be determined whether a case insensitive match occurs. In contrast to the handling of the same request 306 FIG. 3, in this instance, the request 404 is completed and the file system operation is performed in association with the "test.exe" file 122 because the file system 102 first determines that a case sensitive match for the file name given in the request 404 (e.g., "Test.exe") does not exist in the "child1" directory 116. The file system 102 then determines that a case insensitive match for the file name given in the request 404 (e.g., "Test.exe") exists in the "child1" directory 116. That is, the "child1" directory 116 includes a file 120 with an actual file name of "TEST.exe" and a file 122 with an actual file name of "test.exe". However, in this instance, the "test.exe" file 122 is selected over the "TEST.exe" file 120 due to the preferred case insensitive match tag 402 assigned to the "text.exe" file 122.

Figure 5:
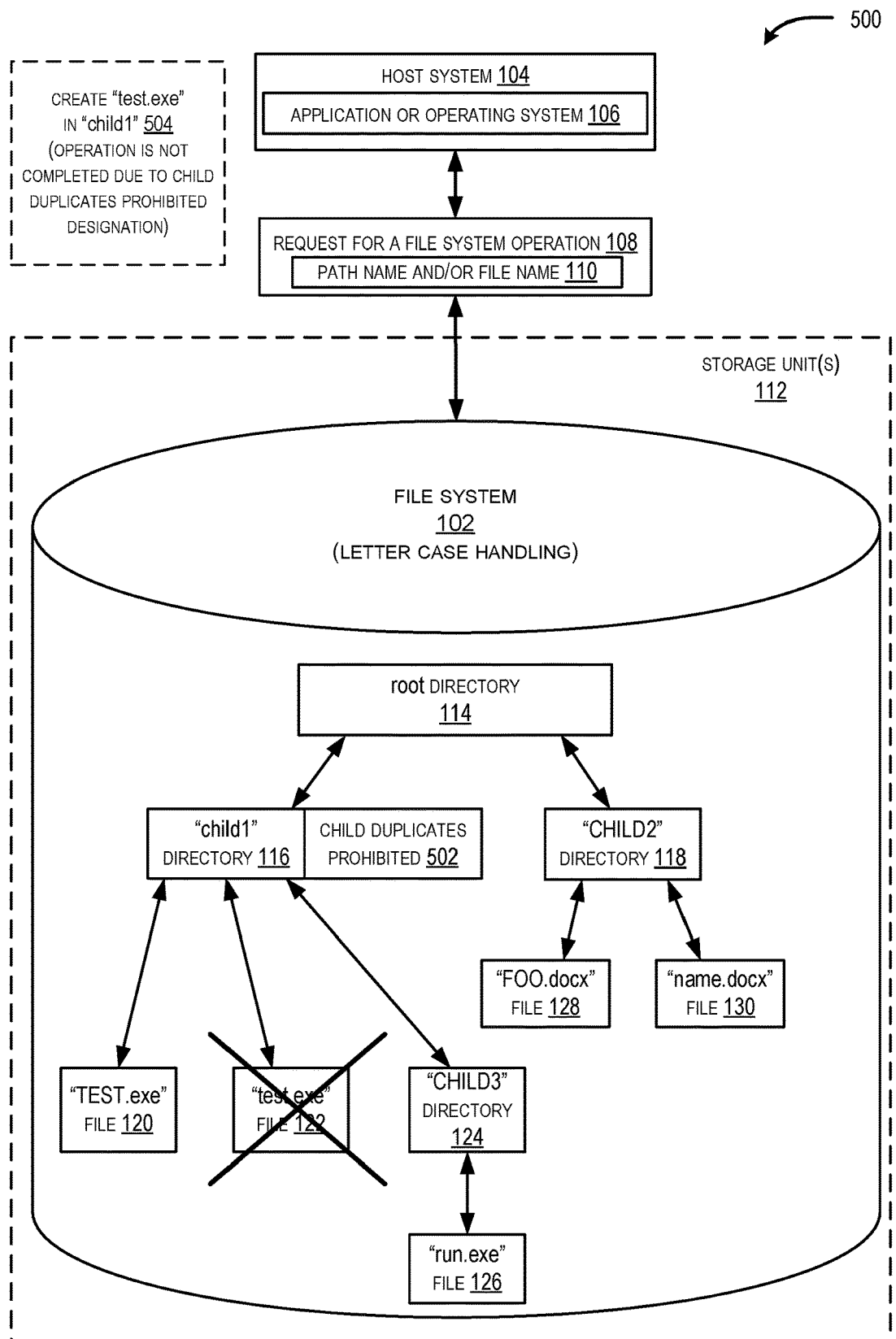
FIG. 5 is an example diagram depicting a file system that is configured to use a designation that prohibits case varying duplicates in order to determine whether a file system operation can be performed.

FIG. 5 is an example diagram 500 depicting a file system 102 that is configured to use a designation that prohibits case varying duplicate file names in order to determine whether a file system operation (e.g., create a file) can be performed. In various examples, a creator or developer (e.g., a user) of the directory can specify the designation, or the designation can be a default designation for individual directories in a file system.

In FIG. 5, the "child1" directory 116 is assigned a child duplicates prohibited designation 502. As described above, a "child" refers to an immediate node (e.g., a file or a directory) contained in the directory at a level in a hierarchical structure directly below the directory to which the designation is assigned. FIG. 5 illustrates a request 504 to create the file "test.exe" in the "child1" directory. Given the request 504, the file system 102 checks the "child1" directory 116 and determines that the "child1" directory 116 already contains a file named "TEST.exe" 120 and that, via the child duplicates prohibited designation 502, creation or addition of a file named "test. exe" in the "child1" directory 116 is not allowed (as shown by the "X" through the illustrated "test.exe" file 122). Note that creation or addition of a file named "test.exe" in the "child1" directory 116 is not allowed because the "test.exe" file 122 would be added at a same level as the "TEST. exe" file 120, and therefore, two children nodes with a case varying duplicate name in a level directly below a directory with the child duplicates prohibited designation 502 would exist. Consequently, in this instance, the request 504 is not completed and the file system operation is not performed.

Due to the child duplicates prohibited designation 502 which governs the "child1" directory 116, another node (e.g., file or directory) named "Child3" or "child3" is similarly not allowed to be created or added because the "child1" directory 116 already contains the "CHILD3" directory 124.

Figure 6:
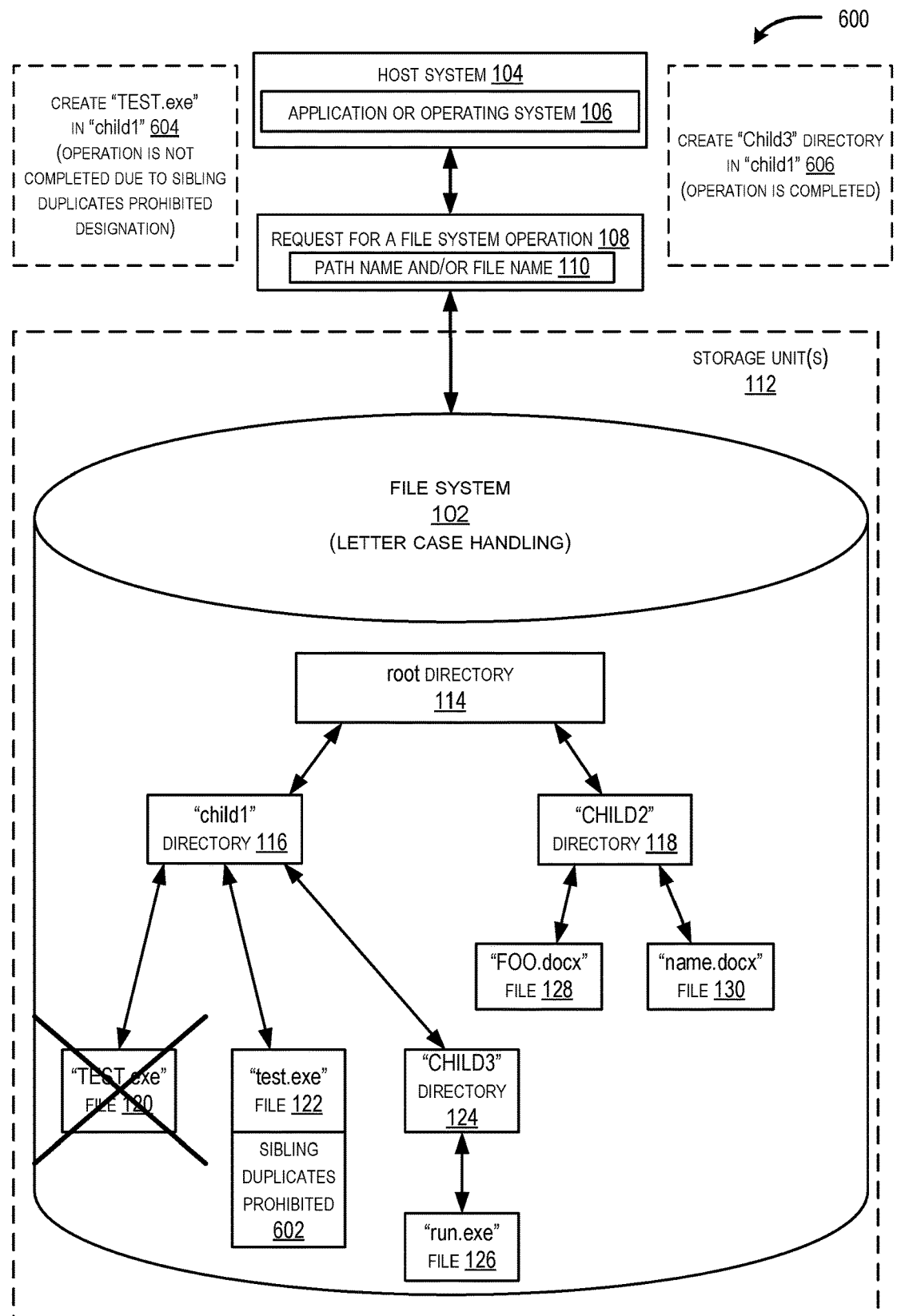
FIG. 6 is another example diagram depicting a file system that is configured to use another designation that prohibits case varying duplicates in order to determine whether a file system operation can be performed.

FIG. 6 is another example diagram 600 depicting a file system 102 that is configured to use a designation that prohibits case varying duplicates in order to determine whether a file system operation (e.g., create a file) can be performed. In FIG. 6, the "test.exe" file 122 is assigned a sibling duplicates prohibited designation 602. As described above, "siblings" refers to two nodes within the same directory and that are part of the same level in the hierarchical structure. FIG. 6 illustrates a first request 604 to create the file "TEST.exe" in the "child1" directory. Given the request 604, the file system 102 checks the contents of the "child1" directory 116 and determines that the "test.exe" file 122 that already exists is assigned a sibling duplicates prohibited designation 602, and therefore, creation or addition of a file named "TEST.exe" in the "child1" directory 116 is not allowed (as shown by the "X" through the illustrated "TEST.exe" file 120). Consequently, in this instance, the request 604 is not completed and the file system operation is not performed.

FIG. 6 also illustrates a second request 606 to create a directory named "Child3" in the "child1" directory. Given the request 606, the file system 102 checks the contents of the "child1" directory 116 and determines that the "CHILD3" directory 124 that already exists is not assigned a sibling duplicates prohibited designation, and therefore, creation or addition of a new directory named "Child3" in the "child1" directory 116 is allowed. Consequently, in this instance, the request 606 is completed and the file system operation is performed.

The different designations described above can be assigned separately or can be combined or packaged such that they are assigned with one another to effectively provide an element of security for a file system. While the examples above assign designations to specific directories and/or files, a designation can additionally or alternatively be assigned to a volume and/or to individual file system operations to be performed. For instance, read operations for a directory can be assigned a case insensitive designation, while write operations for the directory can be assigned a case sensitive designation.

Figure 7:
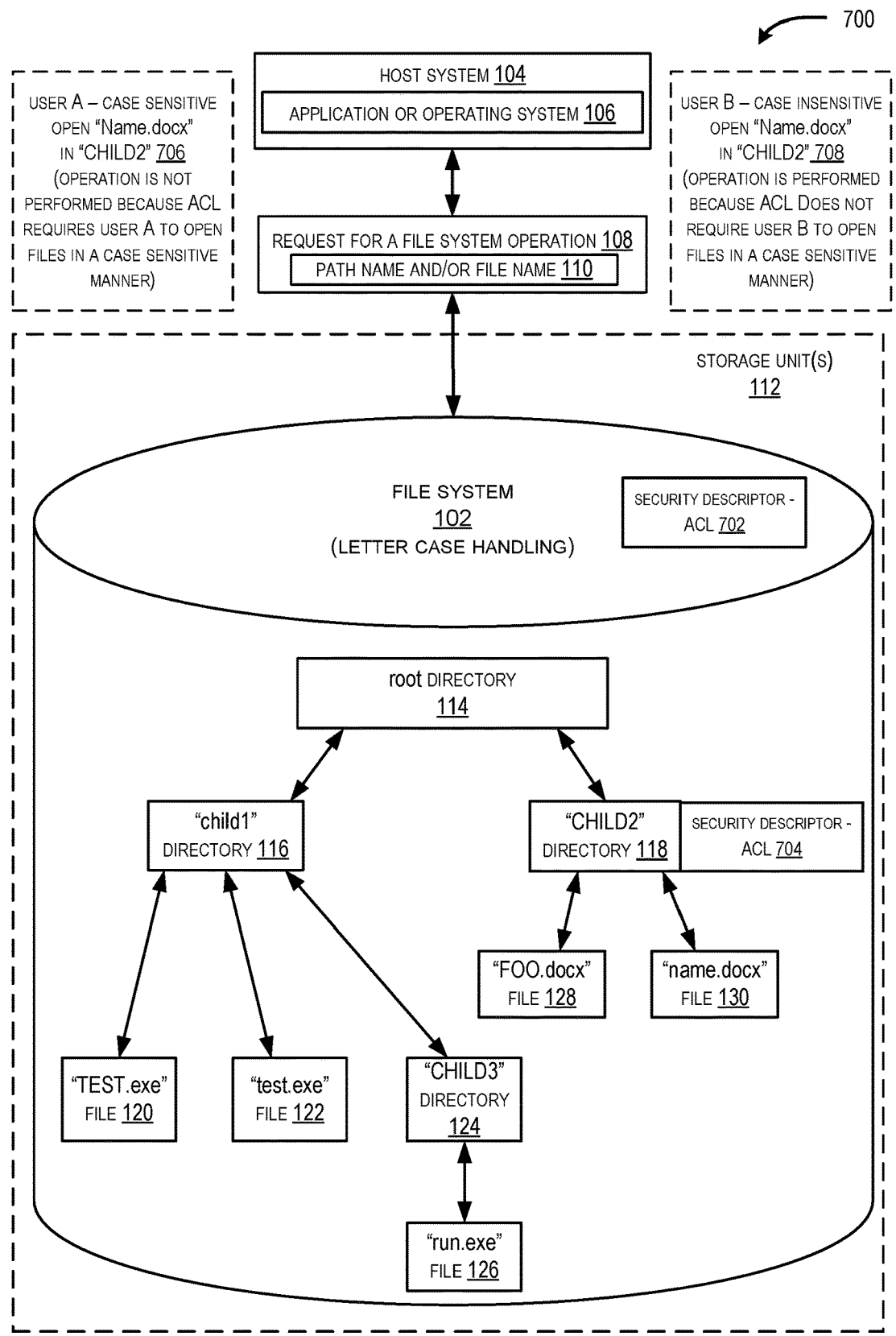
FIG. 7 is an example diagram depicting a file system that is configured to use a security descriptor and/or an access control list in order to determine which users and/or groups can assign designations to a directory or a file and/or which users and/or groups can perform a file system operation in accordance with a designation.

FIG. 7 is an example diagram 700 depicting a file system 102 that is configured to use a security descriptor and/or an access control list in order to determine which users and/or groups can assign designations to a directory or a file and/or which users and/or groups can perform a file system operation in accordance with a designation. As described above, a security descriptor can be associated with the file system, with a directory in the file system, or with a file in the file system. The security descriptor can include an access control list (ACL) that defines user accounts and/or group accounts to which a designation is applicable. The ACL can also define user accounts and/or group accounts that have permissions to assign designations and/or attributes to directories and/or files in the file system.

For instance, FIG. 7 illustrates that the file system 102 is associated with a security descriptor that includes an ACL 702, and that the "CHILD2" directory 118 has a security descriptor that includes an ACL 704. The ACL 702 can define user accounts and/or group accounts that are permitted to assign attributes and designations to individual directories and/or files in the file system 102, as described above with respect to FIGS. 2-6. As an example, USER A, who is listed in the ACL 702 can add an attribute with a case sensitive designation to a directory in the file system 102, while USER B who is not listed in the ACL cannot add an attribute with a case sensitive designation to a directory in the file system 102.

The ACL 704 can define user accounts and/or group accounts to which attributes and designations are applied when a request for a file system operation is received, as described above with respect to FIGS. 2-6. FIG. 7 illustrates a request in association with USER A 706 to open "Name.docx" in the "CHILD2" directory. If the "CHILD2" directory 118 is assigned an attribute indicating a case sensitive designation and the ACL 704 includes USER A, then the operation is not performed because the attribute is applicable to file system operations requested in association with an account of USER A and there is no case sensitive match for "Name.docx", as provided in the request 706. In contrast, FIG. 7 illustrates another request in association with USER B 708 to open "Name.docx" in the "CHILD2" directory. If the "CHILD2" directory 118 is assigned the same attribute indicating a case sensitive designation but the ACL 704 does not include USER B, then the operation is performed because the attribute is not applicable to file system operations requested in association with an account of USER B and there is a case insensitive match for "Name.docx" in the "CHILD2" directory 118 (e.g., the file 130 "name.docx").

Figure 8:
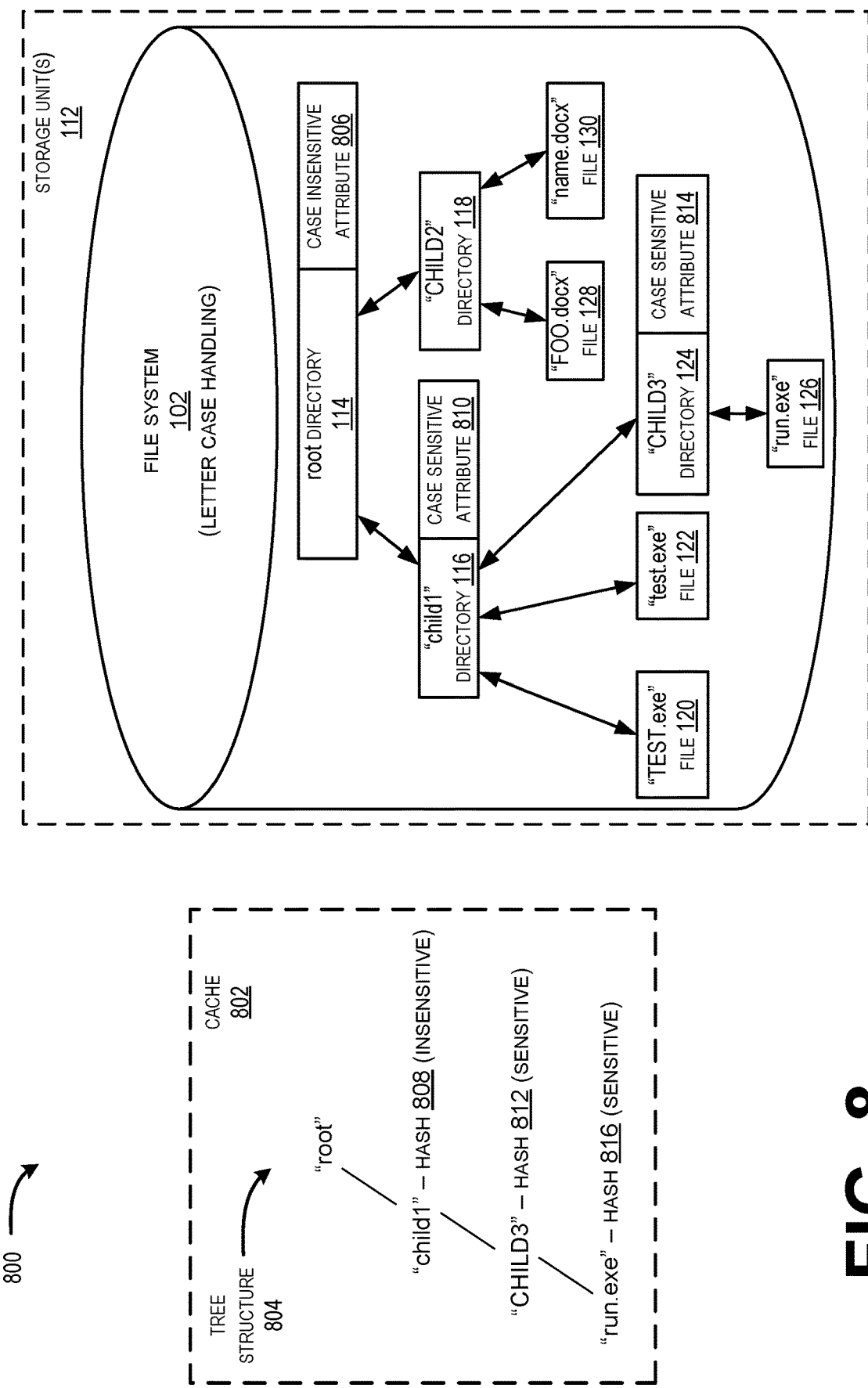
FIG. 8 illustrates a diagram depicting how a hash used by a cache to access a file can be altered in accordance with a case sensitive designation or a case insensitive designation in the file system.

FIG. 8 illustrates a diagram 800 depicting how a hash used by a cache 802 to access a file can be altered in accordance with a case sensitive designation or a case insensitive designation in the file system 102. The file system 102 can have a corresponding cache 802, which is a subset of memory that retains recently used information for quicker access to commonly used files, for example. Typically, a cache of a file system stores an entry that comprises a hash of a full path name useable to access a file. In contrast, an entry in the cache 802 illustrated in FIG. 8 is structured in a hierarchical manner (e.g., a tree structure) such that an individual cache node representing a directory component or a file component in the path name has its own hash, and the hash can be associated with a case sensitive label or a case insensitive label. A case sensitive label or a case insensitive label is determined based on applicable case sensitive designations or case insensitive designations from the file system 102.

To illustrate, the tree structure 804 in the cache 802 represents the example path name which identifies the "root" directory and includes "child1/CHILD3/run.exe" in order to access the "run.exe" file 126 in the file system 102. Since the root directory 114 in the file system 102 is assigned an attribute 806 with a case insensitive designation, then the hash 808 of the "child1" cache node is labeled as a case insensitive hash and can be matched in a case insensitive manner. Note the case sensitivity/insensitivity of the "child1" directory 116 is governed by the attribute 806, and thus, the attribute is applicable to the "child1" cache node in the cache.

Moving on, since the "child1" directory 116 in the file system 102 is assigned an attribute 810 with a case sensitive designation, then the hash 812 of the "CHILD3" cache node is labeled as a case sensitive hash and must be matched in a case insensitive manner. Similarly, since the "CHILD3" directory 124 in the file system 102 is assigned an attribute 814 with a case sensitive designation, then the hash 816 of the "run.exe" cache node is labeled as a case sensitive hash and must be matched in a case sensitive manner.

Figure 9:
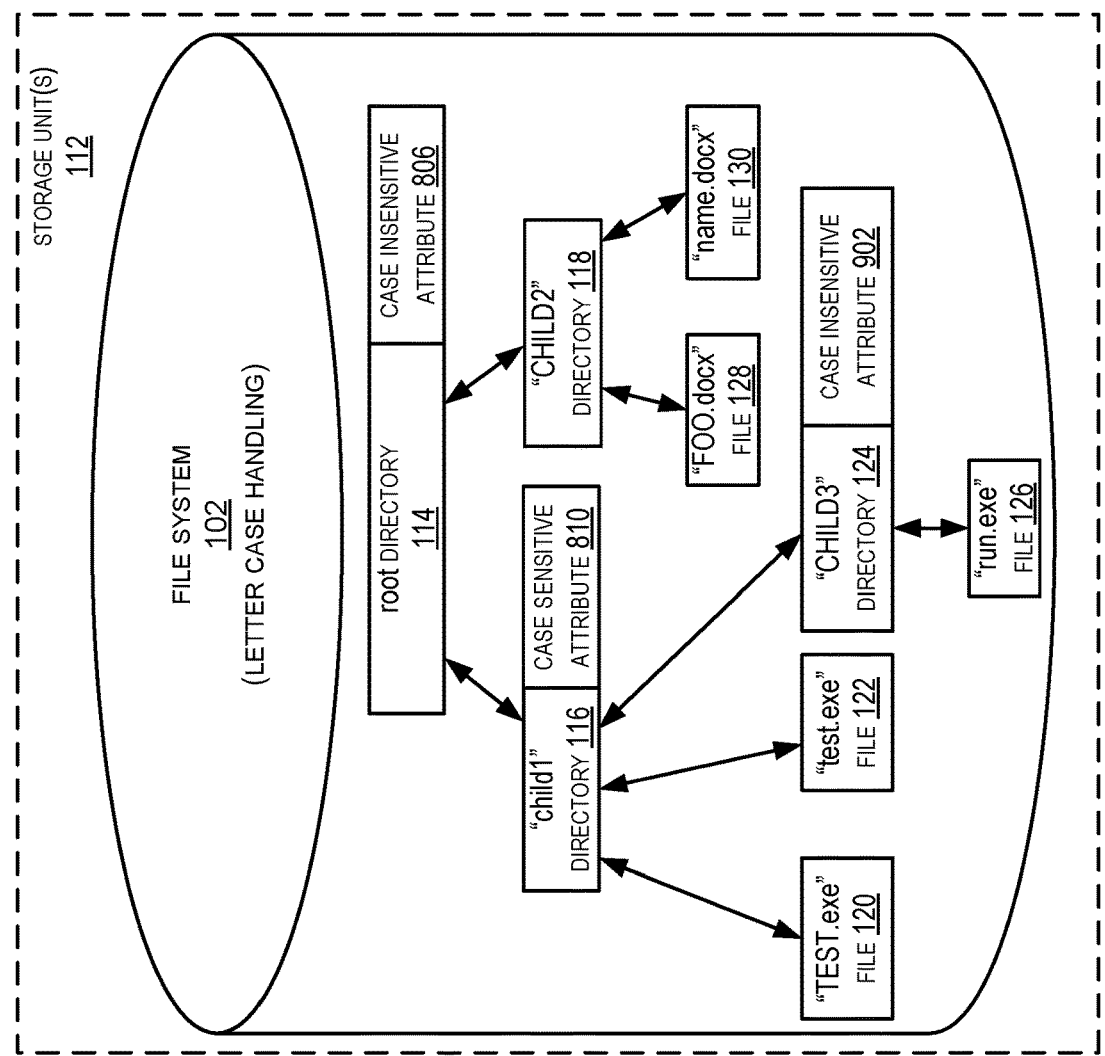
FIG. 9 illustrates another diagram depicting how a hash used by a cache to access a file can be altered in accordance with a case sensitive designation or a case insensitive designation in the file system.
Figure 9:
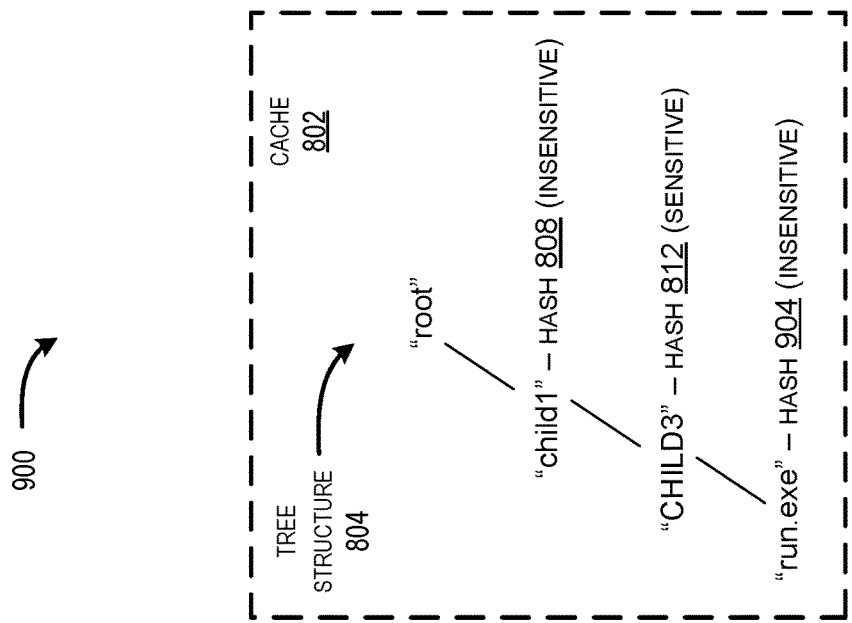

FIG. 9 illustrates a diagram 900 that is similar to FIG. 8, except that the "CHILD3" directory 124 in the file system 102 has a case insensitive attribute 902. Accordingly, the hash 904 of the "run.exe" cache node in the cache 802 is labeled as a case insensitive hash and can be matched in a case insensitive manner.

Consequently, when a hash is used to attempt to access (e.g., look-up) data in the cache, the cache is configured to compare the hash to the individual hashes of the cache nodes in accordance with the labels in order to find a cache hit. Stated another way, a hash look-up (e.g., used to access a file in the cache) is implemented by matching the hash of each cache node in the tree structure in a case sensitive or in a case insensitive manner, rather than matching the hash of the full path name. In some instances, the cache can be a negative cache that includes an entry that indicates a failure or a file that is not present.

Figure 10:
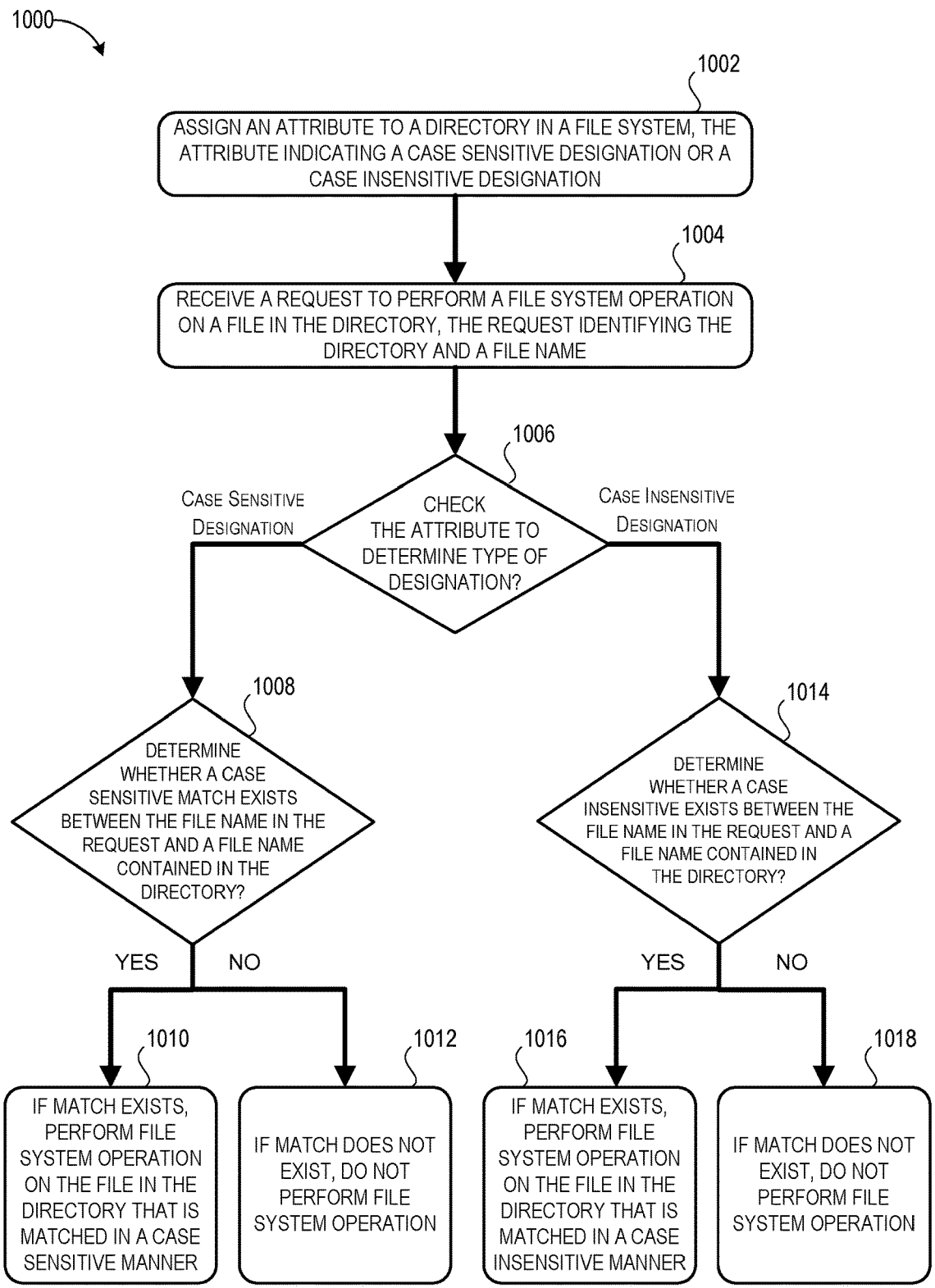
FIG. 10 is a flow diagram of an example process for using a case sensitive designation or a case insensitive designation in order to perform a file system operation.
Figure 11:
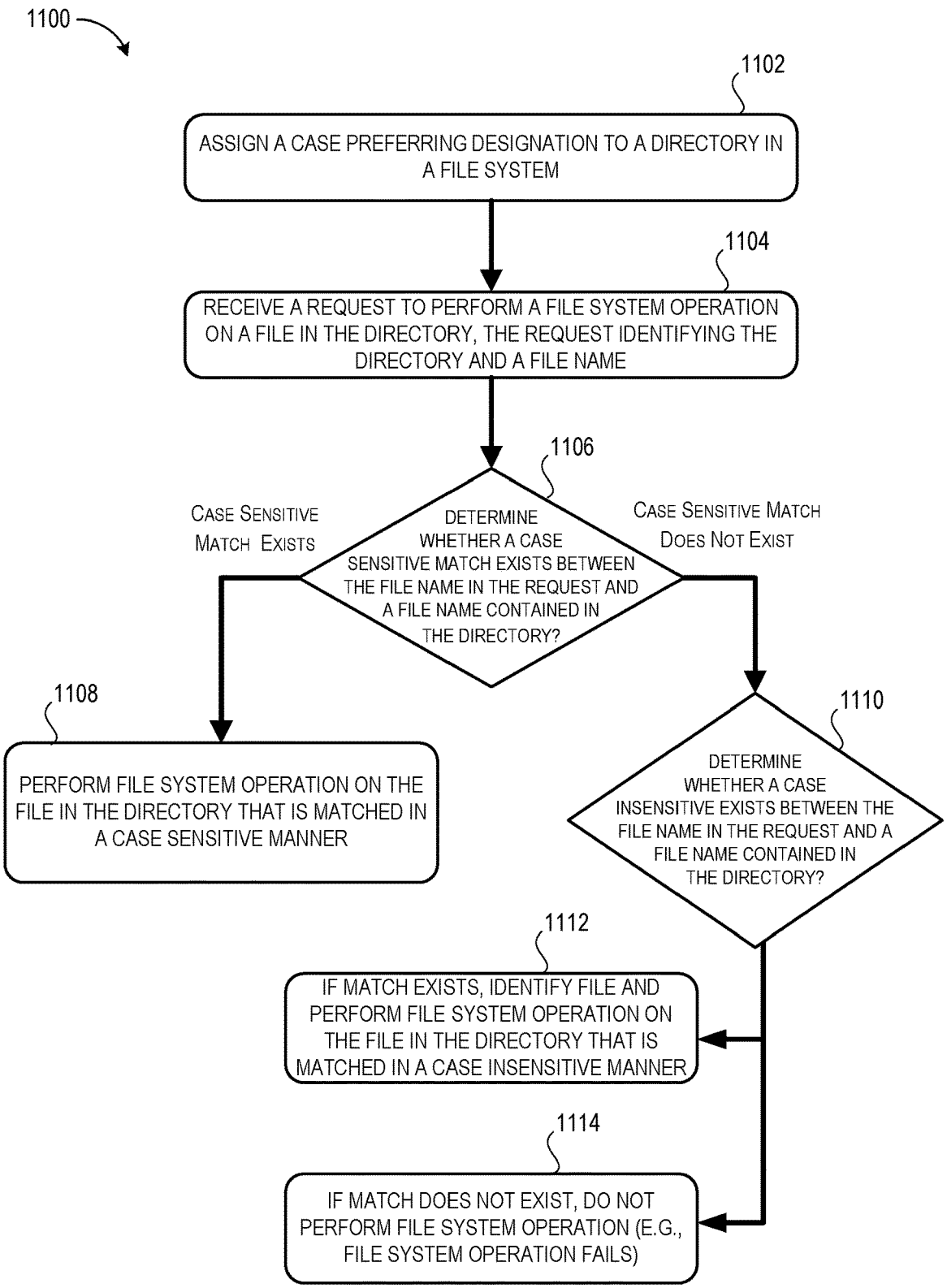
FIG. 11 is a flow diagram of an example process for using a case preferring designation in order to perform a file system operation.
Figure 12:
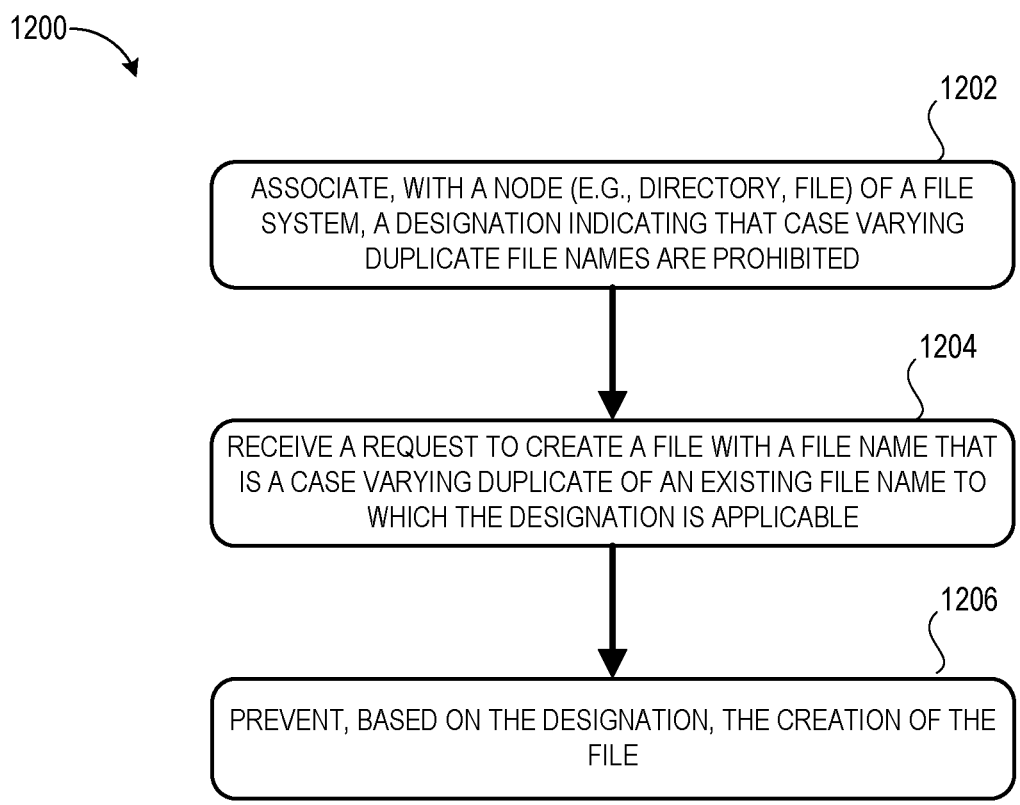
FIG. 12 is a flow diagram of an example process for using a designation that prohibits case varying duplicates in order to determine whether a file system operation can be performed.

Each of FIGS. 10-12 is a flow diagram of an example process of the techniques described herein. It should be understood by those of ordinary skill in the art that the operations of the processes disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims. Moreover, the operations can be performed in accordance with the examples provided above, with respect to any one of FIGS. 1-9.

FIG. 10 is a flow diagram of an example process 1000 for using a case sensitive designation or a case insensitive designation in order to perform a file system operation.

At 1002, an attribute is assigned to a directory in a file system. The attribute indicates a case sensitive designation or a case insensitive designation, as described above with respect to FIG. 2. In some examples, the attribute is assigned based on user input. For instance, a developer or creator of the file system may have permissions granted via an ACL to assign the attribute. In alternative examples, the attribute may be a default attribute assigned based on a default configuration of a file system. In various implementations, the attribute can be published so that a developer of an operating system or an application is aware that the directory is associated with the case sensitive designation or the case insensitive designation At 1004, a request to perform a file system operation is received. As described above, the request can include a path name with a component that identifies a directory and a component that identifies a file name. The request can be received from an application or an operating system executing on a host system. For instance, the file system operation can comprise: opening a file, deleting a file, writing to a file, reading from a file, replacing a file, copying a file, moving a file, searching for a file, and so forth. The example process in FIG. 10 does not apply to creating a new file.

At 1006, the attribute assigned to the directory is checked to determine a type of designation (e.g., whether the directory has a case sensitive designation or a case insensitive designation).

If the type of designation is a case sensitive designation, then the process proceeds to 1008 where it is determined whether a case sensitive match exists between the file name identified by the component in the path name and a file name associated with a file contained in the directory.

If it is determined that a case sensitive match exists within a directory that has a case sensitive designation, then the process proceeds to 1010 and the file system performs the requested file system operation on the file in the directory that is matched in a case sensitive manner (e.g., the file system operation succeeds).

If it is determined that a case sensitive match does not exist within a directory that has a case sensitive designation, then the process proceeds to 1012 and the file system determines that the requested file system operation cannot be performed (e.g., the file system operation fails).

If the type of designation determined at 1006 is a case insensitive designation, then at 1014, it is determined whether a case insensitive (or a case sensitive) match exists between the file name identified by the component in the path name and a file name associated with a file contained in the directory.

If it is determined that a case insensitive match (or a case sensitive) exists within a directory that a case insensitive designation, then the process proceeds to 1016 and the file system performs the requested file system operation on the file in the directory that is matched in a case insensitive (or case sensitive) manner (e.g., the file system operation succeeds).

If it is determined that a case insensitive (or a case sensitive) match does not exist within a directory that has a case insensitive designation, then the process proceeds to 1018 and the file system determines that the requested file system operation cannot be performed (e.g., the file system operation fails).

In various examples, a file name given as part of a request to query the file system and/or a directory for a pattern can include an empty or variable file name component (e.g., a wild card or place holder such as "*") and a file type component. Thus, a user can query a directory for all files of type "exe" by submitting "*.exe" or "exe" as the entry to be searched, and in accordance with the techniques described herein, the file system can return files that match the extension in a case sensitive or a case insensitive manner, regardless of actual file names.

FIG. 11 is a flow diagram of an example process 1100 for using a case preferring designation in order to perform a file system operation.

At 1102, a case preferring designation is assigned to a directory in a file system. In some examples, the case preferring designation is assigned based on user input. For instance, a developer or creator of the file system may have permissions granted via an ACL to assign the case preferring designation. In alternative examples, the case preferring designation may be a default designation.

At 1104, a request to perform a file system operation is received. As described above, the request can include a path name with a component that identifies a directory and a component that identifies a file name. The request can be received from an application or an operating system executing on a host system. Again, the file system operation can comprise: opening a file, deleting a file, writing to a file, reading from a file, replacing a file, copying a file, moving a file, searching for a file, and so forth. The example process in FIG. 11 does not apply to creating a new file.

At 1106, it is first determined, based on the case preferring designation, whether a case sensitive match exists between the file name identified by the component in the path name in the request and a file name associated with a file contained in the directory, as described above with respect to FIG. 3.

If it is determined that a case sensitive match exists, then the process proceeds to 1108 and the file system performs the requested file system operation on the file that is matched in a case sensitive manner (e.g., the file system operation succeeds).

However, if it is determined at 1106 that a case sensitive match does not exist, then the process proceeds to 1110 where it is subsequently determined if a case insensitive match exists between the file name identified by the component in the path name in the request and a file name associated with a file contained in the directory.

If it is determined that a case insensitive match exists, then the process proceeds to 1112 and the file system identifies a file and performs the requested file system operation on the identified file that is matched in a case insensitive manner (e.g., the file system operation succeeds). In various examples, the identified file can be designated as a preferred case insensitive match, as described above with respect to FIG. 4.

If it is determined that a case insensitive match does not exist, then the process proceeds to 1114 and the file system determines that the requested file system operation cannot be performed (e.g., the file system operation fails).

FIG. 12 is a flow diagram of an example process 1200 for using designation that prohibits case varying duplicates in order to determine whether a file system operation can be performed.

At 1202, a designation indicating that case varying duplicate file names (i.e., that vary in case only) are prohibited is associated with a node (e.g., a directory, a file, etc.) in a file system. For example, in FIG. 5, a child duplicates prohibited designation is assigned to a directory to prevent any case varying duplicate names from occurring within the directory. In FIG. 6, a sibling duplicates prohibited designation is assigned to a file to prevent case varying duplicate names of that file occurring within a directory.

At 1204, a request to create a file is received, where a file name of the file is a case varying duplicate of an existing file name in the directory to which the designation is applicable (e.g., "TEST.exe" in FIG. 5, "testexe" in FIG. 6).

At 1206, the creation of the file is prevented (e.g., the requested file system operation fails) based on the designation of no case varying duplicate names. In some implementations, the file system can provide a notification indicating that the request to create the file has failed and requesting that a revised file name be provided.

Figure 13:
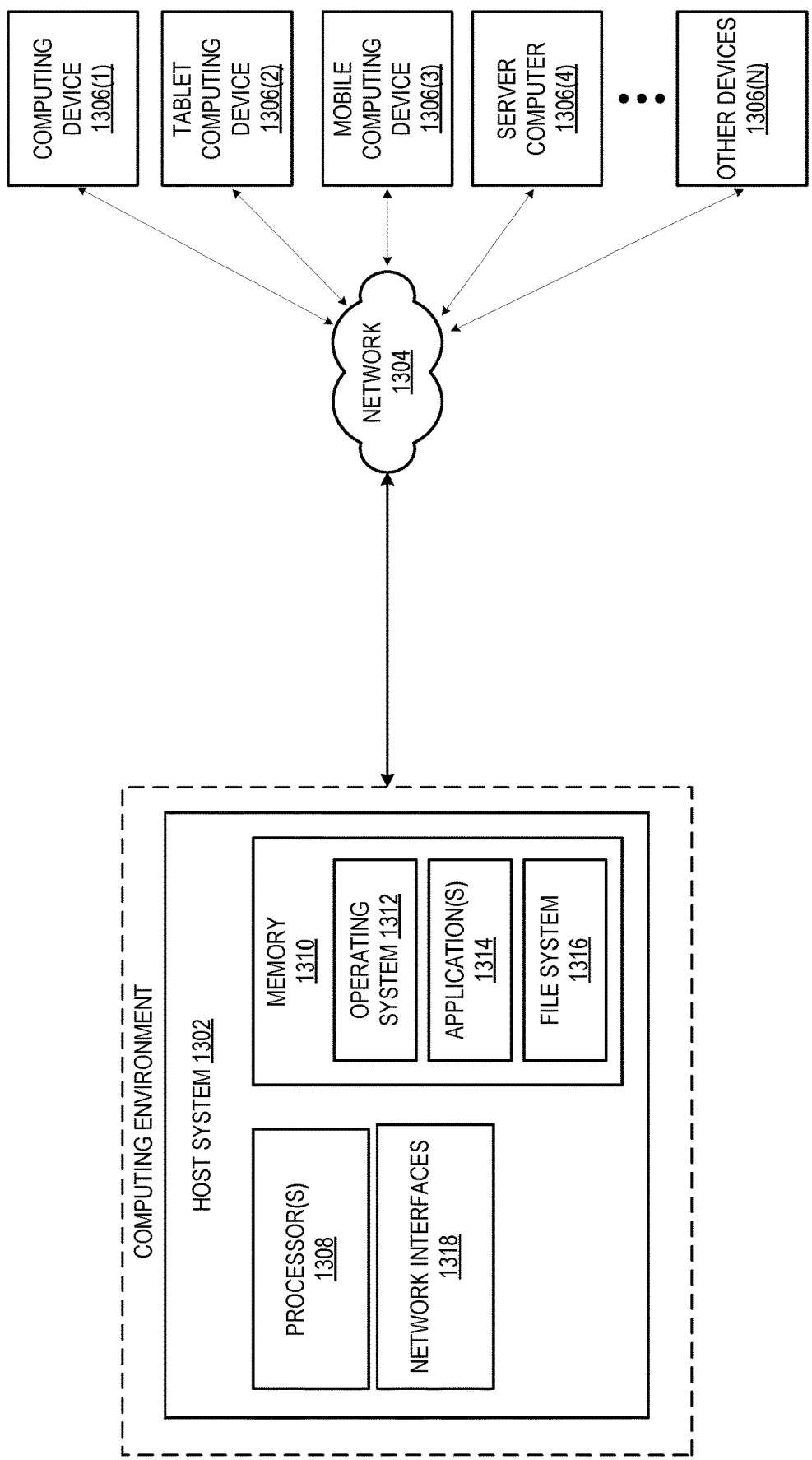
FIG. 13 illustrates an example computing environment capable of executing the techniques and processes described herein.

FIG. 13 illustrates an example computing environment capable of executing the techniques and processes described above with respect to FIGS. 1-12. In various examples, the computing environment comprises a host system 1302. In various examples, the host system 1302 operates on, in communication with, or as part of a network 1304.

The network 1304 can be or can include various access networks. For example, one or more client devices 1306(1) . . . 1306(N) can communicate with the host system 1302 via the network 1304 and/or other connections. The host system 1302 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 1302 can be provided by one or more servers that are executing as part of, or in communication with, the network 1304. A server can host various services, virtual machines, portals, and/or other resources. For example, a can host or provide access to one or more portals, Web sites, and/or other information.

The host system 1302 can include processor(s) 1208 memory 1310. The memory 1310 can comprise an operating system 1312, application(s) 1314, and/or a file system 1316 (e.g., file system 102 along with its cache 802). Moreover, the memory 1310 can comprise the storage unit(s) 112 described above with respect to FIGS. 1-9.

The processor(s) 1308 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 1310.

The memory 1310 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 1302 can communicate over the network 1304 via network interfaces 1318. The network interfaces 1318 can include various types of network hardware and software for supporting communications between two or more devices.

The disclosure presented herein may be considered in view of the following example clauses.

Example Clause A, a system comprising: one or more processors; and one or more storage units comprising a file system that includes one or more directories each containing one or more files and/or one or more directories, the file system executable by the one or more processors to: receive a request to perform a file system operation, the request including a path name with a first component that identifies a directory and a second component that identifies a file name; determine whether the directory is associated with a case sensitive designation or a case insensitive designation; based on a determination that the directory is associated with the case sensitive designation: determine that a case sensitive match exists between the file name identified by the second component of the path name and a file name associated with a file contained in the directory; and perform the file system operation in association with the file contained in the directory based on a determination that the case sensitive match exists between the file name identified by the second component of the path name and the file name associated with the file contained in the directory; and based on a determination that the directory is associated with the case insensitive designation: determine that a case insensitive match exists between the file name identified by the second component of the path name and a file name associated with a file contained in the directory; and perform the file system operation in association with the file contained in the directory based on a determination that the case insensitive match exists between the file name identified by the second component of the path name and the file name associated with the file contained in the directory.

Example Clause B, the system of Example Clause A, wherein the determining whether the directory is associated with the case sensitive designation or the case insensitive designation comprises checking an attribute assigned to the directory.

Example Clause C, the system of Example Clause B, wherein the file system is further executable by the one or more processors to receive an instruction to assign the attribute to the directory, the instruction generated based on user input.

Example Clause D, the system of Example Clause B or Example Clause C, wherein the file system is further executable by the one or more processors to publish the attribute assigned to the directory so that a developer of an operating system or an application is aware that the directory is associated with the case sensitive designation or the case insensitive designation.

Example Clause E, the system of any one of Example Clauses B through D, wherein the attribute is referred to by an access control list defining user accounts or group accounts to be governed by the case sensitive designation or the case insensitive designation.

Example Clause F, the system of any one of Example Clauses A through E, wherein each of the file name identified by the second component and the file name associated with the file contained in the directory comprises a file type.

Example Clause G, the system of Example Clause A, wherein the case sensitive designation or the case insensitive designation associated with the directory comprises a default designation that is part of an initial configuration of the file system.

Example Clause H, the system of any one of Example Clauses A through G, wherein the file system operation comprises one of: open a file, delete a file, write to a file, read from a file, replace a file, copy a file, move a file, or search for a file as part of a query given a pattern.

Example Clause I, the system of any one of Example Clauses A through H, wherein the file system is further executable by the one or more processors to: create, in a cache associated with the file system, a tree structure of an actual path name for accessing the file contained in the directory, the tree structure including cache nodes corresponding to one or more directory components and a file component of the actual path name; and generate, for an individual cache node, a hash; and associate a label with the hash, the label indicating that the hash is to be matched in a case sensitive manner or in a case insensitive manner.

Example Clause J, the system of Example Clause I, wherein the file system is further executable by the one or more processors to use the hash of the individual cache node in the case insensitive manner or in the case insensitive manner to determine a cache hit in the cache.

While Example Clauses A through J are described above with respect to a system, it is understood in the context of this disclosure that the subject matter of Example Clauses A through J can additionally or alternatively be implemented as a method or via executable instructions stored in memory.

Example Clause K, a system comprising: one or more processors; and one or more storage units comprising a file system that includes one or more directories each containing one or more files and/or one or more directories, the file system executable by the one or more processors to: receive a request to perform a file system operation, the request including a path name with a first component that identifies a directory and a second component that identifies a file name; determine that the directory is associated with a case sensitive designation thereby requiring a case sensitive match to successfully perform the file system operation; determine that the case sensitive match exists between the file name identified by the second component of the path name and a file name associated with a file contained in the directory; and based on a determination that the case sensitive match exists between the file name identified by the second component of the path name and the file name associated with the file contained in the directory, perform the file system operation in association with the file contained in the directory.

While Example Clause K is described above with respect to a system, it is understood in the context of this disclosure that the subject matter of Example Clause K can additionally or alternatively be implemented as a method or via executable instructions stored in memory.

Example Clause L, a system comprising: one or more processors; and one or more storage units comprising a file system that includes one or more directories each containing one or more files and/or one or more directories, the file system executable by the one or more processors to: receive a request to perform a file system operation, the request including a path name with a first component that identifies a directory and a second component that identifies a file name; determine that the directory is associated with a case insensitive designation thereby allowing a case insensitive match to successfully perform the file system operation; determine that the case insensitive match exists between the file name identified by the second component of the path name and a file name associated with a file contained in the directory; and perform the file system operation in association with the file contained in the directory based on a determination that the case insensitive match exists between the file name identified by the second component of the path name and the file name associated with the file contained in the directory.

While Example Clause L is described above with respect to a system, it is understood in the context of this disclosure that the subject matter of Example Clause L can additionally or alternatively be implemented as a method or via executable instructions stored in memory.

Example Clause M, a system comprising: one or more processors; and one or more storage units comprising a file system that includes one or more directories each containing one or more files and/or one or more directories, the file system executable by the one or more processors to: receive a request to perform a file system operation, the request including a path name with a first component that identifies a directory and a second component that identifies a file name; determine that a case sensitive match does not exist in the directory for the file name identified by the second component of the path name; determine that a case insensitive match exists between the file name identified by the second component of the path name and a file name associated with a file contained in the directory; and based on a determination that that the case insensitive match exists between the file name identified by the second component of the path name and the file name associated with the file contained in the directory, perform the file system operation in association with the file contained in the directory.

Example Clause N, the system of Example Clause M, wherein the file name associated with the file contained in the directory is designated as a preferred case insensitive match.

Example Clause O, the system of Example Clause N, wherein the file system is further executable by the one or more processors to receive an instruction to designate the file name associated with the file contained in the directory as the preferred case insensitive match, the instruction generated based on user input.

Example Clause P, the system of Example Clause O, wherein the user input is provided via a user account or a group account listed in an access control list associated with the file contained in the directory, the access control list defining user accounts or group accounts that have permission to designate the file contained in the directory as the preferred case insensitive match.

Example Clause Q, the system of any one of Example Clauses M through P, wherein the file system operation comprises one of: open a file, delete a file, write to a file, read from a file, replace a file, copy a file, move a file, or search for a file as part of a query given a pattern.

While Example Clauses M through Q are described above with respect to a system, it is understood in the context of this disclosure that the subject matter of Example Clauses M through Q can additionally or alternatively be implemented as a method or via executable instructions stored in memory.

Example Clause R, a system comprising: one or more processors; and one or more storage units comprising a file system that includes one or more directories each containing one or more files and/or one or more directories, the file system executable by the one or more processors to: receive a request to perform a file system operation, the request including a path name with a first component that identifies a directory and a second component that identifies a file name; determine whether a case sensitive match exists in the directory for the file name identified by the second component of the path name; and based on a determination that the case sensitive match exists, perform the file system operation in association with a file contained in the directory that is a case sensitive match with the file name identified by the second component of the path name; and based on a determination that the case sensitive match does not exist: determine that a case insensitive match exists between the file name identified by the second component of the path name and a file name associated with a file contained in the directory; and perform the file system operation in association with the file contained in the directory.

While Example Clause R is described above with respect to a system, it is understood in the context of this disclosure that the subject matter of Example Clause R can additionally or alternatively be implemented as a method or via executable instructions stored in memory.

Example Clause S, a system comprising: one or more processors; and one or more storage units comprising a file system that includes one or more directories each containing one or more files and/or one or more directories, the file system executable by the one or more processors to: associate a designation with a directory in the file system, the designation indicating that the directory is prohibited from containing two or more files with case varying duplicate file names; receive a request to create a file with a file name in the directory, the file name being a case varying duplicate file name of an existing file name in the directory; and prevent, based at least in part on the designation, creation of the file in the directory.

Example Clause T, the system of Example Clause S, wherein the file system is further executable by the one or more processors to receive an instruction to associate the designation with the directory, the instruction generated based on user input.

Example Clause U, the system of Example Clause T, wherein the user input is provided via a user account or a group account listed in an access control list associated with the directory, the access control list defining user accounts or group accounts that have permission to designate the directory as a directory that is prohibited from containing the two or more files with the case varying duplicate file names.

Example Clause V, the system of Example Clause S, wherein the designation associated with the directory comprises a default designation.

Example Clause W, the system of Example Clause S, wherein the designation associated with the directory is different from a default configuration in the file system which allows the two or more files to have the case varying duplicate file names.

While Example Clauses S through W are described above with respect to a system, it is understood in the context of this disclosure that the subject matter of Example Clauses S through W can additionally or alternatively be implemented as a method or via executable instructions stored in memory.

Example Clause X, a system comprising: one or more processors; and one or more storage units comprising a file system that includes one or more directories each containing one or more files and/or one or more directories, the file system executable by the one or more processors to: associate a designation with a first file in a directory of the file system, the designation indicating that a first file name of the first file cannot have a case varying duplicate file name within the directory; receive a request to create a second file with a second file name in the directory, the second file name being a case varying duplicate file name of the first file name; and prevent, based at least in part on the designation, creation of the second file in the directory.

While Example Clause X is described above with respect to a system, it is understood in the context of this disclosure that the subject matter of Example Clause X can additionally or alternatively be implemented as a method or via executable instructions stored in memory.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system comprising:
one or more processors; and
one or more storage units comprising a file system that includes one or more directories each containing one or more files and/or one or more directories, the file system executable by the one or more processors to:
receive a request to perform a file system operation, the request including a path name with a first component that identifies a directory and a second component that identifies a file name;
determine whether the directory is assigned a directory-specific case sensitive designation or a directory-specific case insensitive designation, wherein:
the determining whether the directory is assigned the directory-specific case sensitive designation or the directory-specific case insensitive designation comprises checking an attribute assigned to the directory; and
the attribute is referred to by an access control list defining user accounts or group accounts to be governed by the directory-specific case sensitive designation or the directory-specific case insensitive designation;
based on a determination that the directory is assigned the directory-specific case sensitive designation:
determine whether a case sensitive match exists between the file name identified by the second component of the path name and a file name associated with a file contained in the directory; and
perform the file system operation in association with the file contained in the directory based on a determination that the case sensitive match exists between the file name identified by the second component of the path name and the file name associated with the file contained in the directory; or
refrain from performing the file system operation in association with the file contained in the directory based on a determination that the case sensitive match does not exist between the file name identified by the second component of the path name and the file name associated with a file contained in the directory; or
based on a determination that the directory is assigned the directory-specific case insensitive designation:
determine that a case insensitive match exists between the file name identified by the second component of the path name and a file name associated with a file contained in the directory; and
perform the file system operation in association with the file contained in the directory based on a determination that the case insensitive match exists between the file name identified by the second component of the path name and the file name associated with the file contained in the directory.

2. The system of claim 1, wherein the file system is further executable by the one or more processors to receive an instruction to assign the attribute to the directory, the instruction generated based on user input.

3. The system of claim 1, wherein the file system is further executable by the one or more processors to publish the attribute assigned to the directory so that a developer of an operating system or an application is aware that the directory is associated with the directory-specific case sensitive designation or the directory-specific case insensitive designation.

4. The system of claim 1, wherein each of the file name identified by the second component and the file name associated with the file contained in the directory comprises a file type.

5. The system of claim 1, wherein the directory-specific case sensitive designation or the directory-specific case insensitive designation assigned to the directory comprises a default designation that is part of an initial configuration of the file system.

6. The system of claim 1, wherein the file system operation comprises one of:
   open a file,
   delete a file,
   write to a file,
   read from a file,
   replace a file,
   copy a file,
   move a file, or
   search for a file as part of a query given a pattern.

7. The system of claim 1, wherein the file system is further executable by the one or more processors to:
   create, in a cache associated with the file system, a tree structure of an actual path name for accessing the file contained in the directory, the tree structure including cache nodes corresponding to one or more directory components and a file component of the actual path name; and
   generate, for an individual cache node, a hash; and
   associate a label with the hash, the label indicating that the hash is to be matched in a case sensitive manner or in a case insensitive manner.

8. The system of claim 7, wherein the file system is further executable by the one or more processors to use the hash of the individual cache node in the case sensitive manner or in the case insensitive manner to determine a cache hit in the cache.

9. A system comprising:
   one or more processors; and
   one or more storage units comprising a file system that includes one or more directories each containing one or more files and/or one or more directories, the file system executable by the one or more processors to:
   receive a request to perform a file system operation, the request including a path name with a first component that identifies a directory and a second component that identifies a file name;
   determine that a case sensitive match does not exist in the directory for the file name identified by the second component of the path name;
   based on a determination that the directory is assigned a case insensitive designation, determine that a case insensitive match exists between the file name identified by the second component of the path name and a file name associated with a file contained in the directory; and
   based on a determination that the case sensitive match does not exist in the directory and that the case insensitive match exists between the file name identified by the second component of the path name and the file name associated with the file contained in the directory, perform the file system operation in association with the file contained in the directory, wherein the file name associated with the file contained in the directory is designated as a preferred case insensitive match so the file system operation is performed on the file rather than one or more other files in the directory that also have one or more corresponding file names that are case insensitive matches.

10. The system of claim 9, wherein the file system is further executable by the one or more processors to receive an instruction to designate the file name associated with the file contained in the directory as the preferred case insensitive match, the instruction generated based on user input.

11. The system of claim 10, wherein the user input is provided via a user account or a group account listed in an access control list associated with the file contained in the directory, the access control list defining user accounts or group accounts that have permission to designate the file contained in the directory as the preferred case insensitive match.

12. The system of claim 9, wherein the file system operation comprises one of:
   open a file,
   delete a file,
   write to a file,
   read from a file,
   replace a file,
   copy a file,
   move a file, or
   search for a file as part of a query given a pattern.

13. A system comprising:
   one or more processors; and
   one or more storage units comprising a file system that includes one or more directories each containing one or more files and/or one or more directories, the file system executable by the one or more processors to:
   receive an instruction to associate a first designation with a first directory in the file system and to associate a second designation with the second directory in the file system, the instruction generated based on user input, wherein:
      the first designation indicates that the first directory is prohibited from containing two or more files with case varying duplicate file names and the second designation indicates that the second directory is allowed to contain two or more files with case varying duplicate file names; and
      the user input is provided via a user account or a group account listed in an access control list associated with the first directory and the second directory, the access control list defining user accounts or group accounts that have permission to designate the first directory as a directory that is prohibited from containing the two or more files with the case varying duplicate file names;
   associate, based at least in part on the instruction, the first designation with the first directory;
   receive a request to create a first file with a first file name in the first directory, the first file name being a first case varying duplicate file name of a first existing file name in the first directory;
   prevent, based at least in part on the first designation, creation of the first file in the first directory;
   associate, based at least in part on the instruction, the second designation with the second directory;
   receive a request to create a second file with a second file name in the second directory, the second file name being a second case varying duplicate file name of a second existing file name in the second directory; and
   allow, based at least in part on the second designation, creation of the second file in the second directory.

14. The system of claim 13, wherein the first designation associated with the first directory or the second designation associated with the second directory comprises a default designation.

15. The system of claim 13, wherein the first directory and the second directory are part of a same root directory.

* * * * *